United States Patent
Yokoyama

(10) Patent No.: US 9,049,604 B2
(45) Date of Patent: Jun. 2, 2015

(54) COMMUNICATION SYSTEM, METHOD OF DETECTING HOLE AREA, BASE STATION APPARATUS, AND MOBILE STATION APPARATUS

(71) Applicant: FUJITSU LIMITED, Kawasaki-shi, Kanagawa (JP)

(72) Inventor: Hitoshi Yokoyama, Shinagawa (JP)

(73) Assignee: FUJITSU LIMITED, Kawasaki (JP)

( * ) Notice: Subject to any disclaimer, the term of this patent is extended or adjusted under 35 U.S.C. 154(b) by 256 days.

(21) Appl. No.: 13/892,902

(22) Filed: May 13, 2013

(65) Prior Publication Data

US 2013/0244643 A1  Sep. 19, 2013

Related U.S. Application Data

(63) Continuation of application No. PCT/JP2011/051214, filed on Jan. 24, 2011.

(51) Int. Cl.
   *H04W 24/08* (2009.01)
   *H04W 16/18* (2009.01)
   *H04W 24/00* (2009.01)

(52) U.S. Cl.
   CPC .............. *H04W 16/18* (2013.01); *H04W 24/00* (2013.01)

(58) Field of Classification Search
   CPC ............................. H04W 16/18; H04W 24/08
   USPC .................................................. 455/423, 424
   See application file for complete search history.

(56) References Cited

U.S. PATENT DOCUMENTS

| 5,878,328 A | 3/1999 | Chawla et al. |
| 2011/0130135 A1* | 6/2011 | Trigui ............................ 455/423 |
| 2011/0195707 A1* | 8/2011 | Faerber et al. ................. 455/423 |

FOREIGN PATENT DOCUMENTS

| JP | 09-187063 | 7/1997 |
| JP | 10-145842 | 5/1998 |
| JP | 2001-339341 | 12/2001 |
| JP | 2002-204478 | 7/2002 |
| JP | 2008-042736 | 2/2008 |
| JP | 2010-130523 | 6/2010 |

OTHER PUBLICATIONS

International search report issued for corresponding International Patent Application No. PCT/JP2011/051214, mailed Mar. 15, 2011, with English translation.
Notice of Reasons for Rejection issued for corresponding Japanese Patent Application No. 2012-554517, mailed Jan. 14, 2014, with a partial English translation.

* cited by examiner

*Primary Examiner* — Christopher M Brandt
(74) *Attorney, Agent, or Firm* — Myers Wolin, LLC

(57) ABSTRACT

A method of detecting a hole area to be generated in a cover area of a communication system which includes a plurality of base station apparatuses and mobile station apparatuses, includes: measuring received powers from the plurality of base station apparatuses at the mobile station apparatuses, and, based on the received power from the other base station apparatus among a plurality of base station apparatuses other than the base station apparatus which covers a cell in which the mobile station apparatuses are positioned, detecting a hole area to be generated when a signal output from the base station apparatus is stopped.

22 Claims, 21 Drawing Sheets

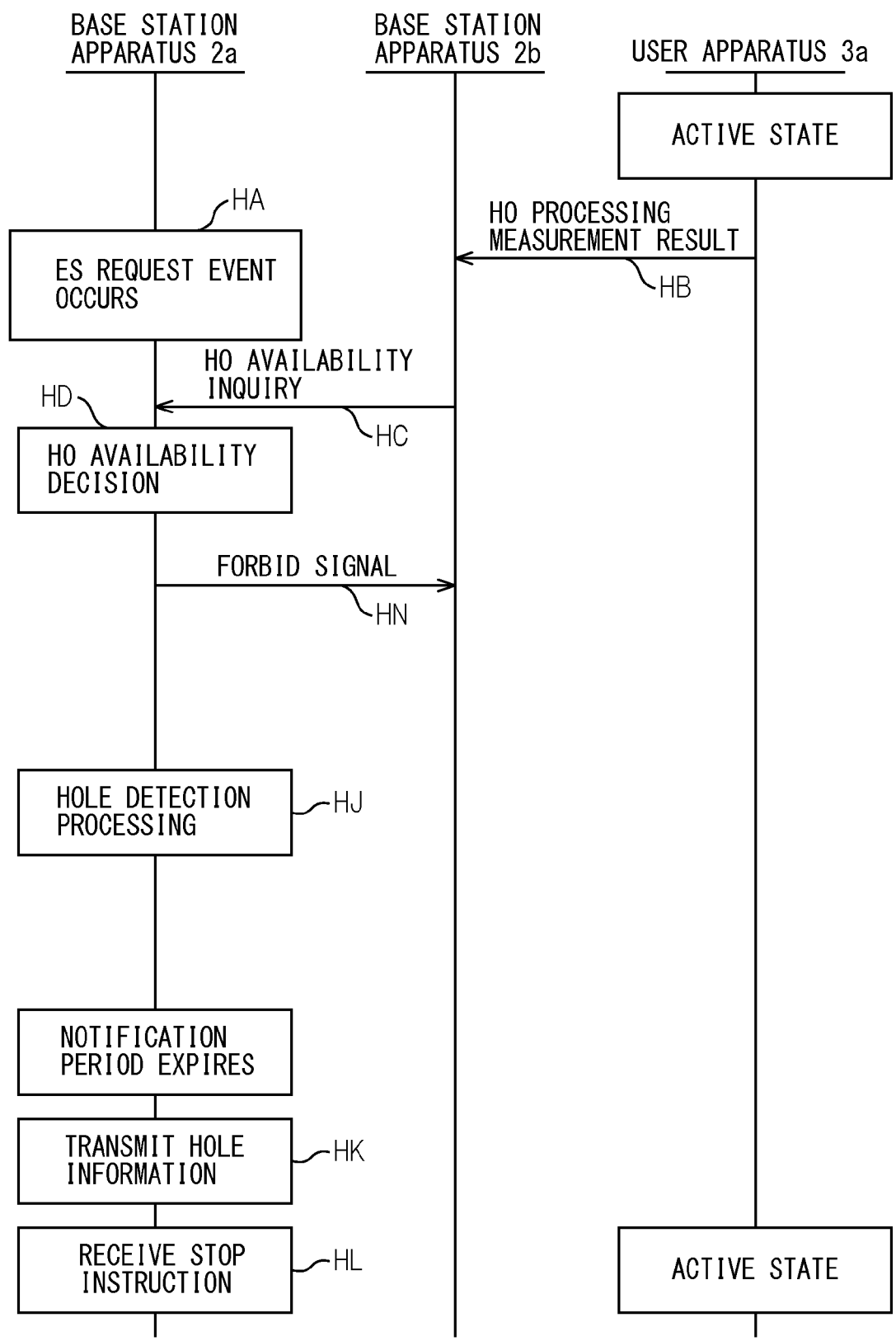

COMMUNICATION SYSTEM, METHOD OF DETECTING HOLE AREA, BASE STATION APPARATUS, AND MOBILE STATION APPARATUS

CROSS-REFERENCE TO RELATED APPLICATIONS

This application is a continuation application based on International application No. PCT/JP2011/051214, filed on Jan. 24, 2011, the entire contents of which are incorporated herein by reference.

FIELD

The embodiments discussed herein relate to detection of a hole area produced in a cover area of a base station apparatus.

BACKGROUND

In some cases, a communication system which includes base station apparatuses and mobile station apparatuses is operated in a state in which transmission power from part of the base station apparatuses is reduced or transmission output therefrom is stopped. For example, an amount of traffic processed by base station apparatuses or power consumption of base station apparatuses is measured, and on/off of transmission power or a transmission output of a base station apparatus is controlled according to the traffic amount.

Such processing includes, for example, energy saving studied in 3GPP (The 3rd Generation Partnership Project). The "energy saving" is also referred to as "ES" in the following illustration.

In addition, a communication area estimating server is known which includes: a receiving unit which receives one or a plurality of pieces of signal information, which is stored in a mobile telephone positioned outside a range of a mobile communication network and relates to signals from radio signal sources, from a mobile telephone when the mobile telephone moves into the range of the mobile communication network; a calculating unit which calculates the position of the mobile telephone when the mobile telephone receives a signal related to signal information, based on one or a plurality of pieces of received signal information; and an estimating unit which estimates a position outside the range of the mobile communication network, based on the calculated position of the mobile telephone.

Further, a mobile communication system is proposed which reduces power consumption by changing a zone configuration of radio base stations depending on a communication traffic state of the system and prevents a communication unavailable area from being generated by changing the zone configuration. This system includes: a group of radio base stations which is formed by arranging one master radio base station which has a variable radio output level and a plurality of slave radio base stations which can stop radio output levels and can be set only to radio receiving operations; and a radio control station which controls the radio base stations of the group, and performs call connection control with switching equipment. The radio control station includes: a unit which collectively monitors communication traffic notified from the radio base stations of the group; a unit which collectively monitors electric field intensities from the master radio base station notified from respective slave radio base stations in the group; a unit which transmits radio output variable control signals to radio base stations of the group; and a database which manages an arrangement configuration of the master radio base station and the plurality of slave radio base stations.

Related art is disclosed in Japanese Laid-open Patent Publications No. 2010-130523 and No. 10-145842.

SUMMARY

According to an aspect of an apparatus, there is provided a communication system including a plurality of base station apparatuses which includes at least a first base station apparatus and a second base station apparatus, and a mobile base station. The mobile station apparatus includes a measuring unit which measures each received power from the plurality of base station apparatuses, and a measurement result notifying unit which notifies a measurement result of the received power to a base station apparatus which covers a cell in which the mobile base station apparatus is positioned, among the plurality of base station apparatuses. The first base station apparatus includes a measurement result receiving unit which receives the measurement result notified when the mobile station apparatus is positioned in a cell of the first base station apparatus, and a hole detecting unit which, based on a measurement result obtained from the mobile station apparatus by measuring received power which is received from the surrounding base station apparatus including the first base station apparatus, detects a hole area to be generated provided that any other base station apparatus measured information except the first base station apparatus are not received after a transmission power from the first base station apparatus is switched off.

According to another aspect of an apparatus, there is provided a base station apparatus including, a measurement result receiving unit which receives measurement results of received power from a plurality of base station apparatuses each measured by a mobile station apparatus, from the mobile station apparatus which is positioned in the cell covered by the base station apparatus, and a hole detecting unit which, based on a measurement result obtained from the mobile station apparatus by measuring received power from any other base station apparatus measured information except the first base station apparatus, detects a hole area which is to be generated when a transmission power from the base station apparatus is switched off.

According to another aspect of an apparatus, there is provided a mobile station apparatus including an instruction receiving unit which receives an instruction signal instructing a base station apparatus among a plurality of base station apparatuses, the base station apparatus covering a cell in which the mobile station apparatus is positioned, to notify a measurement result of received power of the base station apparatus, a measuring unit which measures each received power from the plurality of base station apparatuses, and a measurement result notifying unit which notifies the measurement result to the base station apparatus which covers the cell in which the mobile station apparatus is positioned.

According to an aspect of a method, there is provided a method of detecting a hole area to be generated in a cover area of a communication system which includes a plurality of base station apparatuses and a mobile station apparatus. The method includes measuring each received power from the plurality of base station apparatuses at the mobile station apparatus, and detecting the hole area which is to be generated when a transmission power from the base station apparatus, which covers a cell in which the mobile station apparatus is positioned, is switched off, based on received power from the other base station apparatus among the plurality of base station apparatuses, other than a base station apparatus which covers the cell in which the mobile station apparatus is positioned.

BRIEF DESCRIPTION OF DRAWINGS

FIG. 22 is an explanatory diagram (Part 3) of an example of processing when performing a handover.

DESCRIPTION OF EMBODIMENTS

There is a concern that, when transmission power of a given base station apparatus is reduced or transmission output thereof is stopped, a hole area may be generated around the base station apparatus. The hole area is a range which is in a coverage area but communication with mobile station apparatuses is impossible, and is also referred to as a "coverage hole."

An object of the apparatus and the method according to the embodiments is to predict in advance that a hole area is generated when a transmission output of a base station apparatus is stopped.

The hole area described above is prone to be generated when a base station apparatus, which stops an output, is dynamically selected without testing in advance an influence caused by stopping a transmission output. One method of predicting a generation of a hole area may include recording radio quality and position information by a user apparatus which is a mobile station when failure of a radio link occurs, and then detecting a hole area by collecting these pieces of information in a network side. However, according to such method, it is not possible to detect a hole area until failure of a radio link occurs, thereby causing defects to provide services to users.

Figure 1:
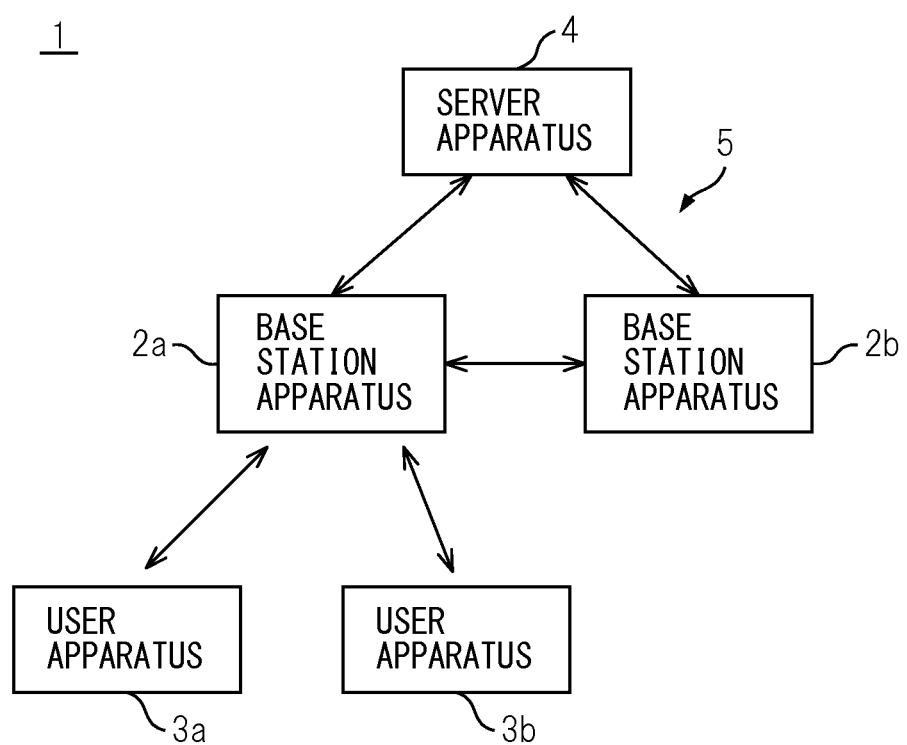
FIG. 1 is a drawing depicting a configuration example of a communication system.

Hereinafter, preferred embodiments will be illustrated with reference to the accompanying drawings. FIG. 1 is a drawing depicting a configuration example of a communication system. A communication system 1 includes a plurality of base stations which includes at least a first base station apparatus 2a and a second base station apparatus 2b. Further, the communication system 1 includes user apparatuses 3a and 3b which are mobile apparatuses, and a server apparatus 4. Note that the base station apparatuses 2a and 2b will be also collectively referred to as a "base station apparatus 2" in the following illustration. Further, the user apparatuses 3a and 3b will be also referred to as a "user apparatus 3" in the following illustration. Furthermore, a base station apparatus which covers a cell in which the user apparatus 3 is positioned will be also referred to as a "serving station."

The first base station apparatus 2a, the second base station apparatus 2b and the server apparatus 4 are connected through a communication network 5. A network which connects the first base station apparatus 2a and the second base station apparatus 2b, and a network which connects the base station apparatus 2 and the server apparatus 4 may be different networks or a single network.

The base station apparatus 2 detects generation of a hole area which may be generated when the base station apparatus 2 stops a transmission output, and notifies a detection result to the server apparatus 4. The server apparatus 4 decides whether or not to stop the transmission output from the base station apparatus 2, according to the detection result of the hole area. When stopping the transmission output from the base station apparatus 2, the server apparatus 4 instructs the base station apparatus 2 to stop the transmission output.

For example, the server apparatus 4 may request the base station apparatus 2 to stop the transmission output according to ES studied in 3GPP. The base station apparatus 2 may perform processing of detecting the hole area according to a request from the server apparatus 4, and notify the detection result to the server apparatus 4. For example, the base station apparatus 2 may measure radio resource use states of the base station apparatus 2 and neighboring base station apparatuses, perform processing of detecting the hole area according to the measurement result and notify the detection result to the server apparatus 4.

Figure 2:
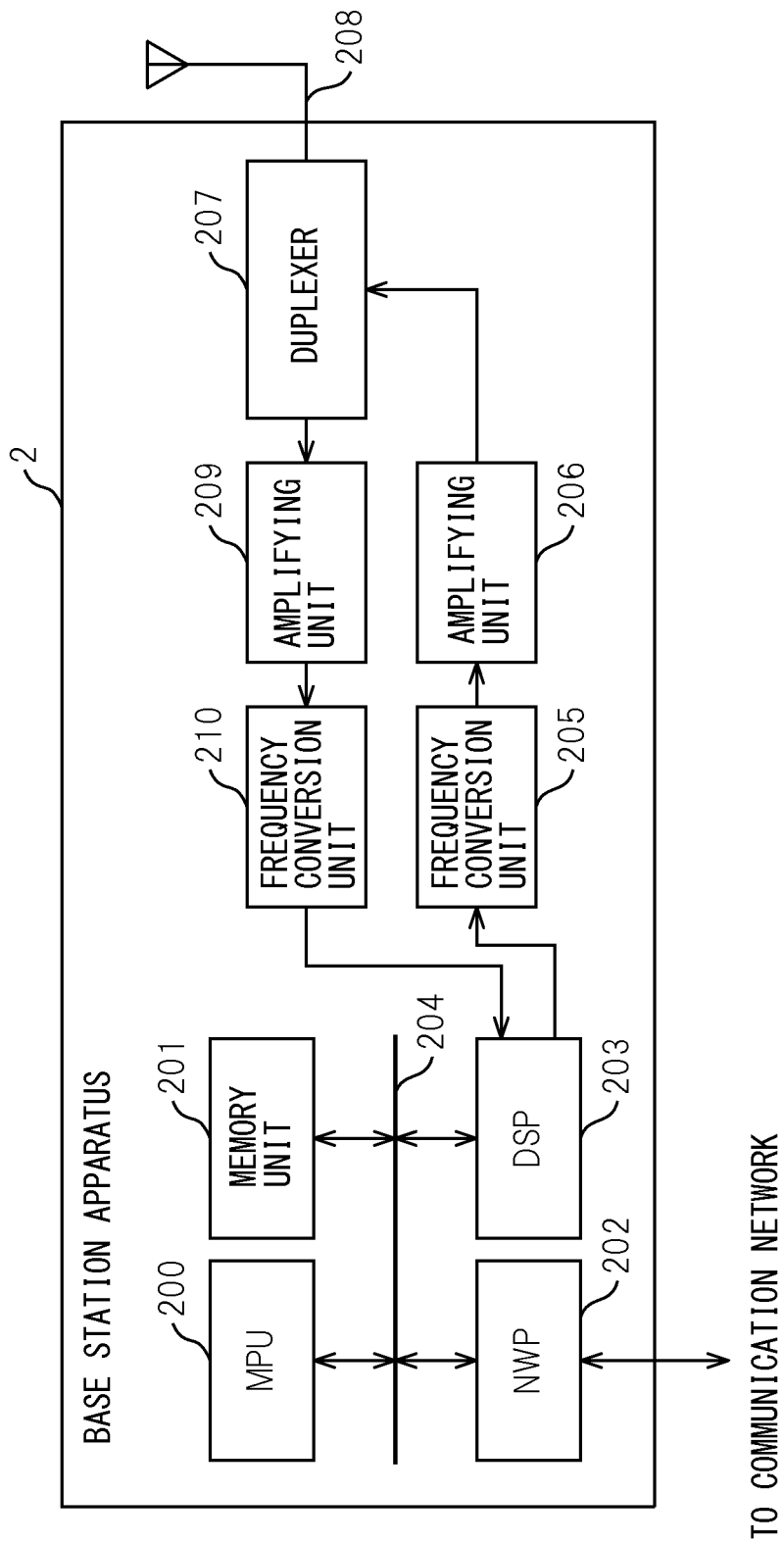
FIG. 2 is a drawing depicting an example of a hardware configuration of a base station apparatus.

Subsequently, each component of the communication system 1 will be illustrated. FIG. 2 is a drawing depicting an example of a hardware configuration of the base station apparatus 2. The base station apparatus 2 includes a microprocessor 200, a memory unit 201, a network processor 202, a digital signal processor 203 and a bus 204. In the following illustration and the drawings, the microprocessor, the network processor and the digital signal processor will be also referred to as a "MPU," a "NWP" and a "DSP," respectively.

Further, the base station apparatus 2 includes frequency conversion units 205 and 210, amplifying units 206 and 209, a duplexer 207 and an antenna 208.

The MPU 200, the memory unit 201, the NWP 202 and the DSP 203 are connected through the bus 204. In the memory unit 201, various programs and items of data for controlling an operation of the base station apparatus 2 are stored. The memory unit 201 may include, for example, a memory, a hard disk or a non-volatile memory.

The MPU 200 executes each processing for controlling the operation of the base station apparatus 2 by executing a program stored in the memory unit 201. Further, the DSP 203 executes each processing related to communication mainly with the user apparatus 3 by executing a program stored in the memory unit 201.

In the memory unit 201, the programs executed by the MPU 200 and the DSP 203, and data which is temporarily used by these programs are stored. The NWP 202 performs processing of transmitting and receiving signals to and from the other base station apparatus 2 and the server apparatus 4. The NWP 202 may perform processing of transmitting and receiving signals between any of an upper apparatus which controls the base station apparatus 2 and an upper node apparatus which connects the base station apparatus 2 to a core network, and the base station apparatus 2.

The frequency conversion unit 205 converts a signal, which is generated by the DSP 203 and is to be transmitted from the base station apparatus 2 to the user apparatus 3, into a radio frequency. The amplifying unit 206 amplifies a radio frequency signal. The amplified signal is transmitted through the duplexer 207 and the antenna 208.

The radio signal transmitted from the user apparatus 3 is received by the antenna 208. The received signal is inputted to the amplifying unit 209 through the duplexer 207. The amplifying unit 209 amplifies the received signal. The frequency conversion unit 210 converts the received signal with radio frequency which is amplified into a baseband signal. The baseband signal is processed by the DSP 203.

Figure 3:
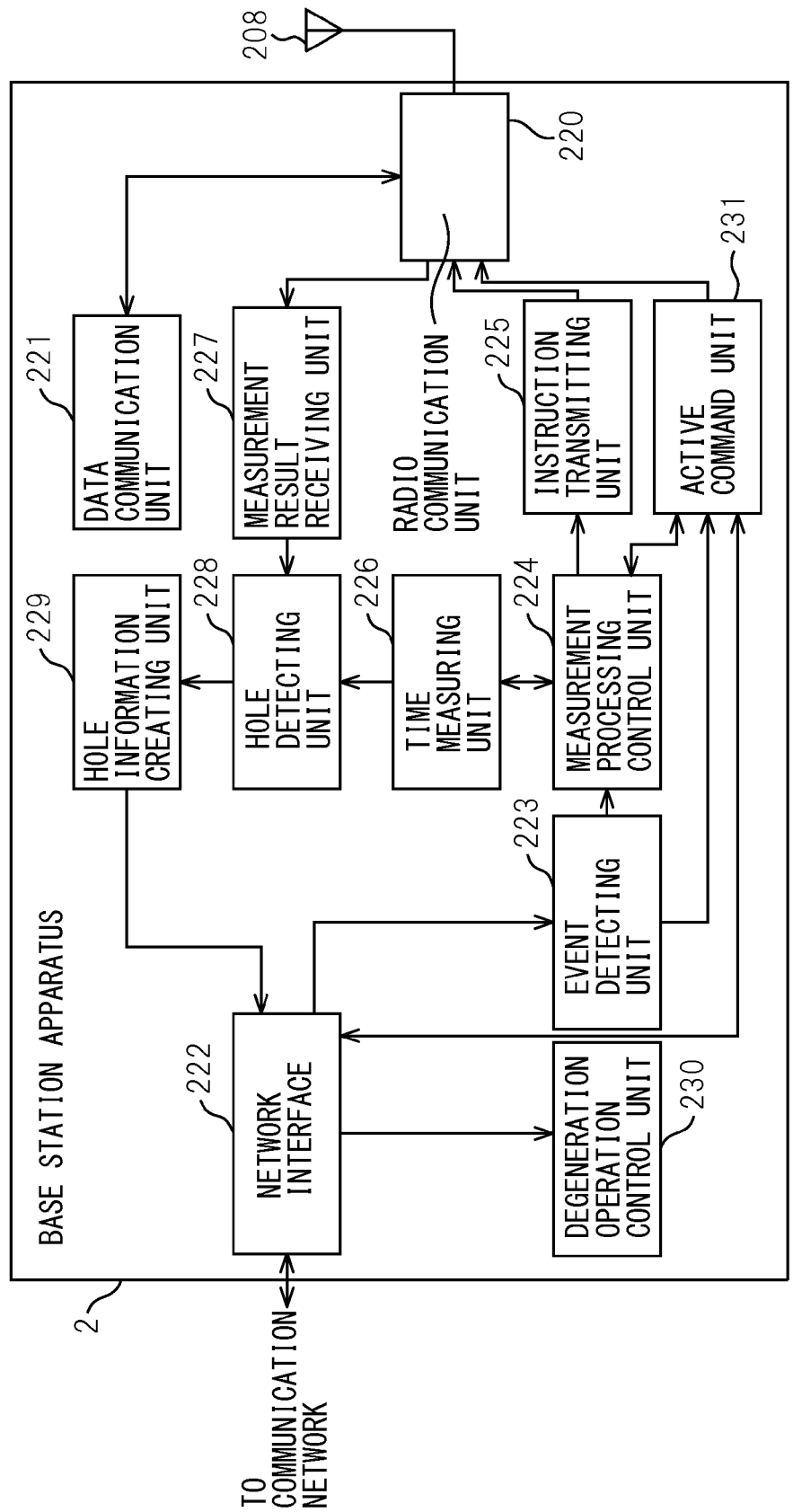
FIG. 3 is a configuration diagram of a first example of the base station apparatus.

FIG. 3 is a configuration diagram of a first example of the base station apparatus 2. The DSP 203 in FIG. 2 performs information processing by means of components depicted in FIG. 3 by executing the program stored in the memory unit 201. The same also applies to an example of the other base station apparatus 2. FIG. 3 mainly depicts functions related to the following illustration. Hence, the base station apparatus 2 may include other components excluding the depicted components.

The base station apparatus 2 includes a radio communication unit 220, a data communication unit 221 and a network interface 222. The base station apparatus 2 includes an event detecting unit 223, a measurement processing control unit 224, an instruction transmitting unit 225, a time measuring unit 226, a measurement result receiving unit 227, a hole detecting unit 228, a hole information creating unit 229, a energy-saving operation control unit 230 and an active command unit 231.

The radio communication unit 220 multiplexes a transmission target digital signal, then converts the signal into a radio frequency signal and transmits the radio frequency signal to the user apparatus 3 through the antenna 208. Further, the radio communication unit 220 converts the radio frequency signal received from the user apparatus 3 through the antenna 208 into a digital signal. The data communication unit 221 transmits and receives data signals to and from the user apparatus 3 through the radio communication unit 220.

The network interface 222 performs processing of transmitting and receiving signals to and from the other base station apparatus 2 and the server apparatus 4. The network interface 222 may perform processing of transmitting and receiving signals between any of an upper apparatus which controls the base station apparatus 2 and an upper node apparatus which connects the base station apparatus 2 to a core network, and the base station apparatus 2.

The event detecting unit 223 detects an occurrence of an event which requests that the base station apparatus 2 stops a transmission output of a signal to the mobile station apparatus 3. In the following illustration, an event which requests to stop the transmission output will be also referred to as an "ES request event."

An example of the ES request event is a request to stop the transmission output from the server apparatus 4. Another example of the ES request event is a decrease in radio resource use rate measured by the base station apparatus 2 or any of the neighboring base station apparatuses 2. The radio resource use rate may be measured based on, for example, the number of users or a traffic amount. The base station apparatus 2 may include a use state measuring unit which measures the radio resource use rate.

When the occurrence of the ES request event is detected, the event detecting unit 223 determines a remaining time TO before a scheduled time for stopping a transmission output. The event detecting unit 223 notifies the occurrence of the ES request event and the remaining time TO to the measurement processing control unit 224.

When the ES request event occurs, the measurement processing control unit 224 selects the user apparatus 3 for causing the user apparatus 3 to notify a measurement result of received power from the base station apparatus 2. The measurement processing control unit 224 may select, for example, the user apparatus 3 which is in an active state described below as a user apparatus for causing the user apparatus to notify the measurement result. Instead of or in addition to the user apparatus 3 which is in the active state, the measurement processing control unit 224 may select the user apparatus 3 which is in an idle state described below as a user apparatus for causing the user apparatus to notify the measurement result.

The measurement processing control unit 224 determines a duration of a notification period N equal to or less than TO based on the remaining time TO. The measurement processing control unit 224 notifies designation information which designates a matter to be included in a notification of the measurement result by the base station apparatus 2 and the notification period N, to the instruction transmitting unit 225. In the following illustration, this designation information will also be referred to as "notification matter designation information."

The notification matter designation information may include, for example, designation of conditions to select any of the base station apparatus 2, the measurement result of which is to be notified by the user apparatus 3. An example of such conditions may include, for example, "a base station apparatus from which the highest received power is measured and a base station apparatus from which the second highest received power is measured." Alternatively, an example of the conditions may be, for example, "a base station apparatus from which the second highest received power is measured." Furthermore, an example of the conditions may include, for example, "a base station apparatus from which received power satisfying predetermined intensity conditions is measured."

Further, for example, the notification matter designation information may designate that position information of the user apparatus upon measurement is to be included in the notification.

The instruction transmitting unit 225 transmits, to the user apparatus 3 selected by the measurement processing control unit 224, an instruction signal which instructs the user apparatus 3 to measure received power from the base station apparatus 2 and to notify the measurement result. The instruction signal includes designation of the notification period N and the notification matter designation information. The instruction signal may include designation of a notification cycle from the user apparatus 3.

The time measuring unit 226 decides whether or not the notification period N has passed. The measurement result receiving unit 227 receives the measurement result transmitted from the user apparatus 3. The hole detecting unit 228 detects a hole area which may be generated when a transmission output from the base station apparatus 3 is stopped, based on the received measurement result. A deciding method in detection processing performed by the hole detecting unit 228 will be described below.

When the time measuring unit 226 detects that the notification period N has passed, the hole detecting unit 228 finishes hole area detection processing. When the time measuring unit 226 detects that the notification period N has passed, the hole information creating unit 229 generates the hole information which indicates related information which is related to a detection state of the hole area or the detected hole area.

The hole area detection state may be, for example, the number of times of detection of the hole area and a ratio of the number of times of detection with respect to the total number of times of measurement. Further, the related information may be, for example, position information of the user apparatus 3, when a measurement result which causes detection of a hole area, is transmitted. The hole information creating unit 229 transmits the hole information to the server apparatus 4 through the network interface 222.

The server apparatus 4 decides whether or not to stop the transmission output of the base station apparatus 2, based on the hole information. The server apparatus 4 transmits an instruction to stop the transmission output, to the base station apparatus 2 according to a decision result. The energy-saving operation control unit 230 receives the instruction to stop the transmission output through the network interface 222. When the instruction to stop the transmission output is received, the energy-saving operation control unit 230 stops the transmission output of the base station apparatus 2.

When the user apparatus 3 which transmits an instruction signal is in the idle state, the active command unit 231 makes the user apparatus 3 transit to the active state. The active state refers to a state in which a measurement result can be transmitted to the base station apparatus 2, and may be, for example, a state in which synchronization with an uplink channel is established. Further, the idle state is a state in which a measurement result is not yet transmitted to the base station apparatus 2, and may be a state where synchronization with an uplink channel is not established. An example of a method of specifying the user apparatus 3 in the idle state and making the user apparatus 3 transit to the active state will be described below.

To select either the idle state or the active state as the operation state of the user apparatus 3 after the measurement result is notified, the instruction signal may include designation of the operation state of the user apparatus 3 after the measurement result is notified.

Figure 4:
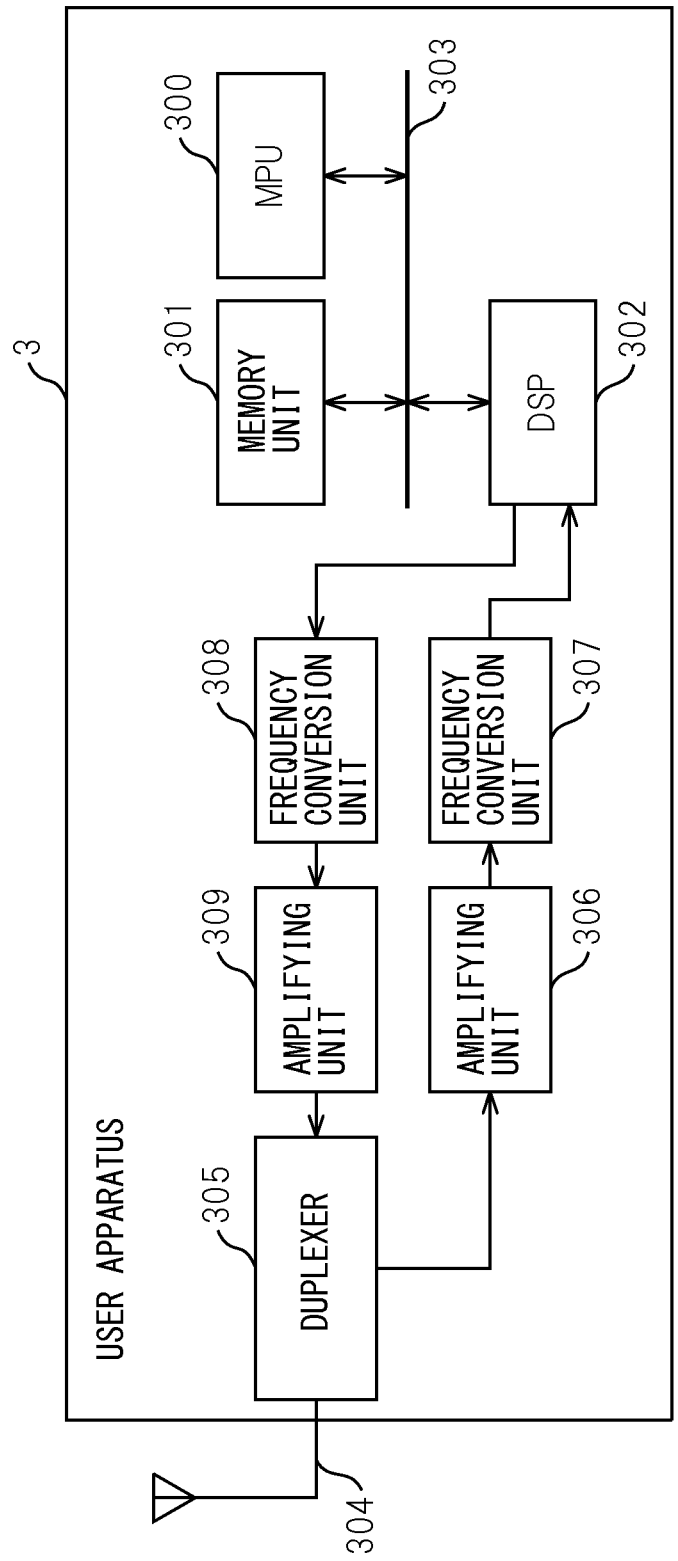
FIG. 4 is a drawing depicting an example of a hardware configuration of a user apparatus.

Subsequently, a configuration of the user apparatus 3 will be illustrated. FIG. 4 is a drawing illustrating an example of a hardware configuration of the user apparatus 3. The user apparatus 3 includes a MPU 300, a memory unit 301, a DSP 302 and a bus 303. Further, the user apparatus 3 includes an antenna 304, a duplexer 305, amplifiers 306 and 309 and frequency conversion units 307 and 308.

The MPU 300, the memory unit 301 and the DSP 302 are connected through the bus 303. In the memory unit 301, various programs and various items of data for controlling an operation of the user apparatus 3 are stored. The memory unit 301 may include, for example, a memory, a hard disk or a non-volatile memory.

The MPU 300 executes each processing of controlling the operation of the user apparatus 3 by executing the program stored in the memory unit 301. Further, the DSP 302 executes each processing related to communication mainly with the base station apparatus 2 by executing the program stored in the memory unit 301. In the memory unit 301, the programs executed by the MPU 300 and the DSP 302, and data which is temporarily used by the programs are stored.

A radio signal transmitted from the base station apparatus 2 is received by the antenna 304. The received signal is inputted to the amplifying unit 306 through the duplexer 305. The amplifying unit 306 amplifies the received signal. The frequency conversion unit 307 converts the received signal with radio frequency which is amplified into a baseband signal. The baseband signal is processed by the DSP 302.

The frequency conversion unit 308 converts the signal, which is generated by the DSP 302 and is to be transmitted from the user apparatus 3 to the base station apparatus 2, into the radio frequency. The amplifying unit 309 amplifies the radio frequency signal. The amplified signal is transmitted through the duplexer 305 and the antenna 304.

Figure 5:
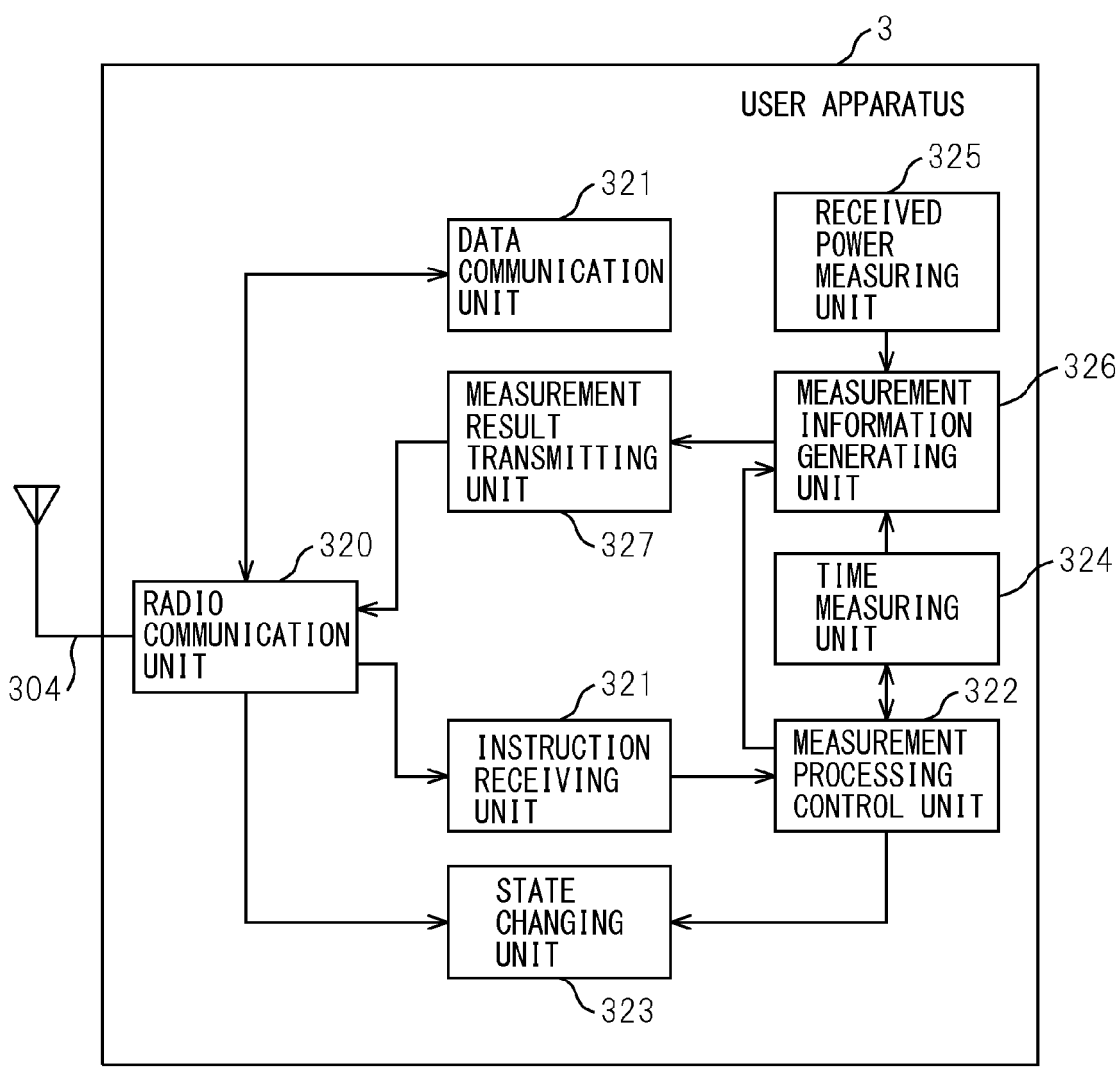
FIG. 5 is a configuration diagram of a first example of the user apparatus.

FIG. 5 is a configuration diagram of the first example of the user apparatus 3. The DSP 302 in FIG. 4 performs information processing by means of the components depicted in FIG. 5 by executing the program stored in the memory unit 301. The same applies to the example of another user apparatus 3. Note that FIG. 5 mainly depicts functions related to the following illustration. Hence, the user apparatus 3 may include components other than the depicted components.

The user apparatus 3 includes a radio communication unit 320, a data communication unit 321, an instruction receiving unit 321, a measurement processing control unit 322, a state changing unit 323, a time measuring unit 324, a received power measuring unit 325, a measurement information generating unit 326 and a measurement result transmitting unit 327. The measurement information generating unit 326 and the measurement result transmitting unit 327 can be examples of a measurement result notifying unit.

The radio communication unit 320 multiplexes a transmission target digital signal, then converts the multiplexed signal into a radio frequency signal and transmits the radio frequency signal to the base station apparatus 2 through the antenna 304. Further, the radio communication unit 320 converts the radio frequency signal received from the base station apparatus 2 through the antenna 304 into a digital signal. The data communication unit 321 transmits and receives a data signal to and from the base station apparatus 2 through the radio communication unit 320.

The instruction receiving unit 321 receives the instruction signal transmitted from the base station apparatus 2. The instruction receiving unit 321 outputs information elements included in the instruction signal to the measurement processing control unit 322. The information elements outputted to the measurement processing control unit 322 include, for example, designation of the notification period N and notification matter designation information.

The information elements may include designation of an operation state of the user apparatus 3 after the measurement result is notified. The designation of an operation state may designate either the idle state or the active state, and the information elements may include designation related to a notification cycle of a measurement result.

When the information elements are received from the instruction receiving unit 321, the measurement processing control unit 322 makes the state changing unit 323 cause a transition of the operation state of the user apparatus 3. In this case, the state changing unit 323 makes the operation state of the user apparatus 3 transit from the active state to the operation state of notifying the measurement result of received power from the base station apparatus 2 to detect generation of a hole area.

In the following illustration, the operation state of notifying the measurement result of received power from the base station apparatus 2 to detect generation of a hole area will be referred to as a "measurement execution state." Further, when a notification of the measurement result is finished, the measurement processing control unit 322 makes the state changing unit 323 cause a transition of the operation state of the user apparatus 3 according to the designation included in the information elements.

The measurement processing control unit 322 outputs the designation of the notification period N included in the information elements to the time measuring unit 324. Further, the measurement processing control unit 322 outputs the notification matter designation information to the measurement information generating unit 326. The measurement processing control unit 322 may output the designation related to the notification period of the measurement result to the measurement information generating unit 326.

The state changing unit 323 causes a transition of the operation state of the user apparatus 3 according to an instruction from the measurement processing control unit 322. Further, when an active command is received from the base station apparatus 2, the state changing unit 323 makes the operation state of the user apparatus 3 transit from the idle state to the active state.

The time measuring unit 324 decides whether or not the notification period N has passed. The received power measuring unit 325 measures received power of a radio signal transmitted from the base station apparatus 2. While the notification period N passes, the measurement information generating unit 326 generates information to be transmitted to the serving station 2 by extracting information designated in the notification matter designation information from measurement results measured by the received power measuring unit 325. In the following illustration, the information which is related to the measurement result and which is to be transmitted to the serving station 2 will be also referred to as "measurement information."

The measurement result transmitting unit 327 transmits the measurement information generated by the measurement information generating unit 326 to the serving station 2 as a measurement result. The measurement information generating unit 326 and the measurement result transmitting unit 327 may generate and transmit measurement information according to the designation related to the notification cycle of the measurement result.

Figure 6:
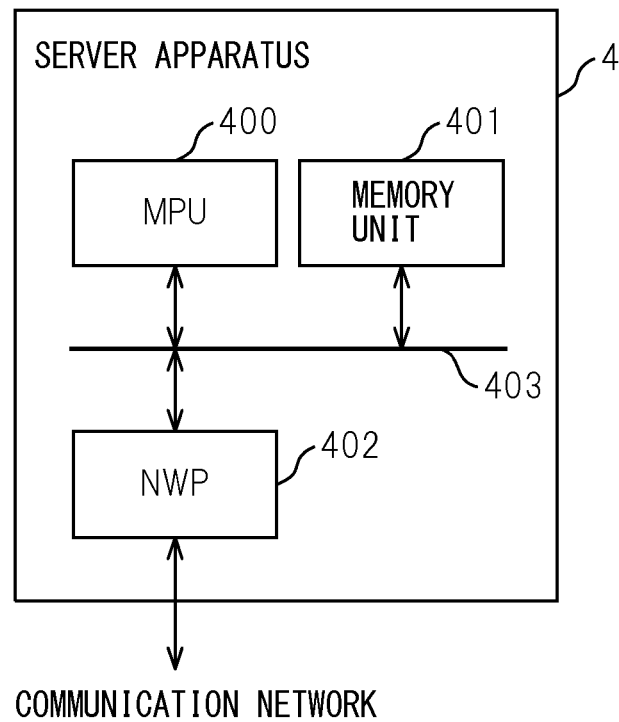
FIG. 6 is a drawing depicting an example of a hardware configuration of a server apparatus.

Next, a configuration of the server apparatus 4 will be illustrated. FIG. 6 is a drawing depicting an example of a hardware configuration of the server apparatus 4. The server apparatus 4 includes a MPU 400, a memory unit 401, a NWP 402 and a bus 403.

The MPU 400, the memory unit 401 and the NWP 402 are connected through the bus 403. In the memory unit 401, various programs and items of data for controlling the operation of the server apparatus 4 are stored. The memory unit 401 may include, for example, a memory, a hard disk and a non-volatile memory.

The MPU 400 executes each processing for controlling the operation of the server apparatus 4 by executing the program stored in the memory unit 401. In the memory unit 401, the program executed by the MPU 400 and data which is temporarily used by the program are stored. The NWP 402 performs processing of transmitting and receiving signals to and from the base station apparatus 2.

Figure 7:
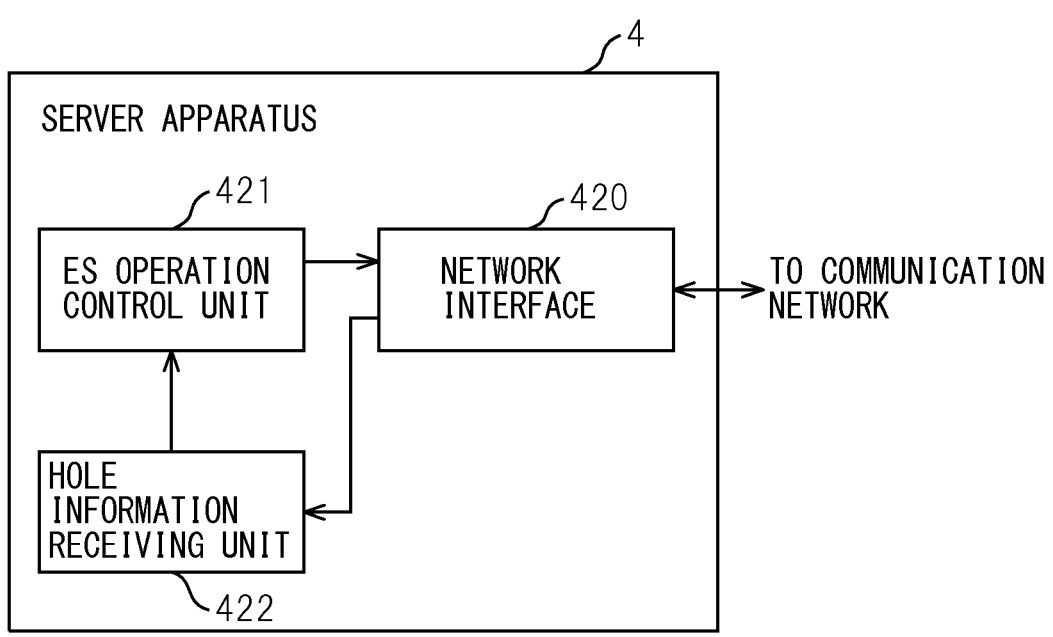
FIG. 7 is a drawing depicting an example of a configuration of the server apparatus.

FIG. 7 is a drawing depicting an example of the configuration of the server apparatus 4. The MPU 400 in FIG. 6 performs information processing of components depicted in FIG. 7 by executing the program stored in the memory unit 401. Note that FIG. 7 mainly depicts functions related to the following illustration. Hence, the server apparatus 4 may include components other than the depicted components.

The server apparatus 4 includes a network interface 420, an ES operation control unit 421 and a hole information receiving unit 422. The network interface 420 performs processing of transmitting and receiving signals to and from the base station apparatus 2.

The ES operation control unit 421 decides whether or not it is necessary to stop a transmission output from the base station apparatus 2. For example, the ES operation control unit 421 may collects a traffic amount or power consumption measured by the base station apparatus 2 through the network 5, and decide whether or not it is necessary to stop the transmission output from the base station apparatus 2 according to the traffic amount or power consumption. The ES operation control unit 421 generates a signal which requests to stop the transmission output from the base station apparatus 2, and transmits the signal to the base station apparatus 2 through the network 5.

The hole information receiving unit 422 receives hole information transmitted from the hole information creating unit 229 of the base station apparatus 2. The ES operation control unit 421 decides whether or not to stop the transmission output from the base station apparatus 2, based on the received hole information. When stopping the transmission output from the base station apparatus 2, the ES operation control unit 421 instructs the base station apparatus 2 to stop the transmission output. In addition, even when the hole information is not received, the ES operation control unit 421 may instruct the base station apparatus 2 to stop the transmission output.

Note that the hardware configurations depicted in FIG. 2, FIG. 4 and FIG. 6 are only a couple of examples of hardware configurations of the base station apparatus 2, the user apparatus 3 and the server apparatus 4. Any other hardware configurations may be employed as long as the hardware configurations execute the processing disclosed herein.

Subsequently, the first example of processing in the communication system 1 will be illustrated with reference to FIG. 8. In addition, each operation of the following operations AA to AH may be steps, in the other embodiments.

In the operation AA, the event detecting unit 223 of the base station apparatus 2 detects an occurrence of an ES request event which requests to stop a transmission output from the base station apparatus 2. At this point of time, the user apparatus 3a is in the idle state, and the user apparatus 3b is in the active state.

In the operation AB, the active command unit 231 specifies the user apparatus 3a which is positioned in a cell of the base station apparatus 2 and which is in the idle state. The active command unit 231 transmits an active command of making the user apparatus 3a transit to the active state, to the user apparatus 3a. In the operation AC, the user apparatus 3a transits to the active state.

Figure 9:
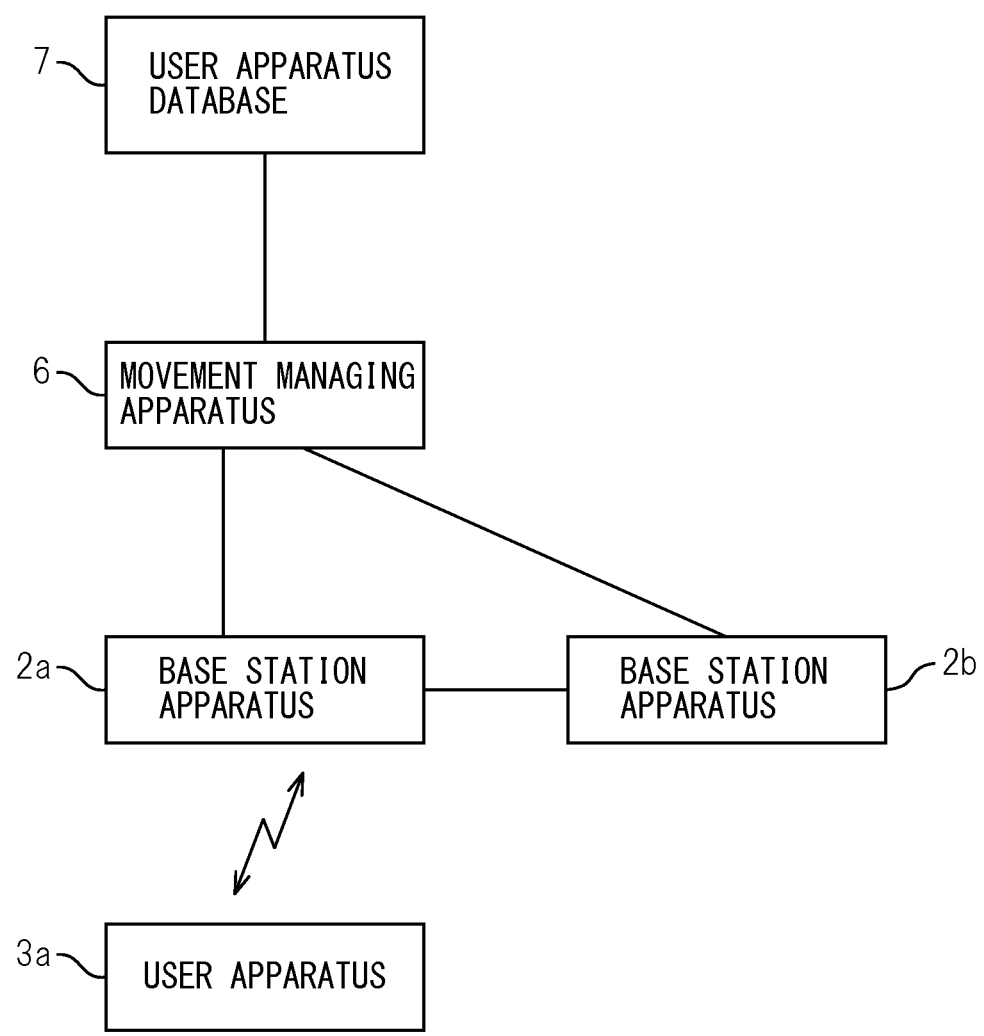
FIG. 9 is an explanatory diagram (Part 1) of an example of specifying processing of the user apparatus.

An example of processing of the active command unit 231 specifying the user apparatus 3a in the idle state will be illustrated with reference to FIG. 9 and FIG. 10. FIG. 9 depicts components related to movement management of the user apparatus 3a in the communication system 1. The user apparatus 3a in the idle state is positioned in a cell of the base station apparatus 2a.

A reference numeral 6 indicates a movement managing apparatus which registers the position of the user apparatus 3a and performs paging processing, and a reference numeral 7 is a user apparatus database which registers position information and class information of the user apparatus 3a. The movement managing apparatus 6 and the user apparatus database 6 may be, for example, a MME (Mobility Management Entity) and a HSS (Home Subscriber Server) in LTE (Long Term Evolution) which is a communication system defined in 3GPP.

Figure 10:
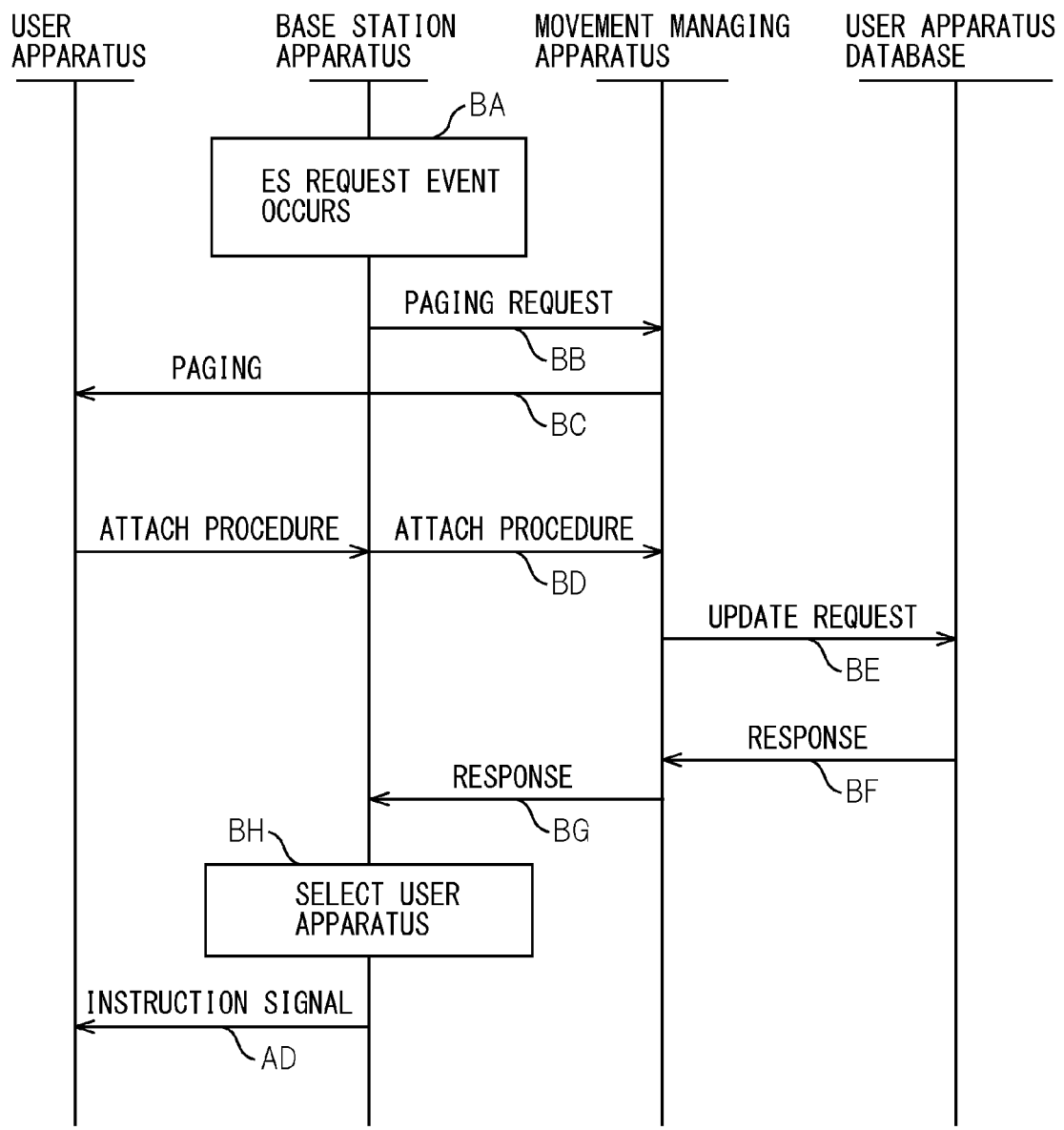
FIG. 10 is an explanatory diagram (Part 2) of an example of specifying processing of the user apparatus.

FIG. 10 depicts an example of processing of specifying the user apparatus 3a in the idle state. In addition, each of the following operations BA to BH may be steps, in the other embodiments. In the operation BA, the event detecting unit 223 detects an occurrence of an ES request event.

In the operation BB, the active command unit 231 requests the movement managing apparatus 6 to page all user apparatuses 3 which have possibilities to be positioned in the cell of the base station apparatus 2a. In the operation BC, the movement managing apparatus 6 pages the user apparatus 3 as an incoming call terminal positioned in a TA (tracking area) in which the base station apparatus 2a is positioned, only through the base station apparatus 2a.

This paging is performed through the base station apparatus 2a, so that the active command unit 231 can specify the user apparatus 3a in the idle state after communication is connected based on the paging. A paging signal transmitted from the base station apparatus 2 is an example of an active command.

The user apparatus 3a which receives the paging starts attach procedure in the operation BD. Radio communication between the user apparatus 3a and the base station apparatus 2a is established by executing the attach procedure, and the user apparatus 3a transits to the active state.

In the attach procedure, the user apparatus 3a notifies class information related to the user apparatus 3a. In the operation BE, the movement managing apparatus 6 makes a request to update the class information related to the user apparatus 3a and registered in the user apparatus database 7.

In the operation BF, the user apparatus database 7 transmits the class information updated in a response signal in response to the update request, to the movement managing apparatus 6. In the operation BG, the movement managing apparatus 6 transmits this class information to the base station apparatus 2a.

In the operation BH, the active command unit 231 decides whether or not the user apparatus 3a supports the above measurement execution state based on the class information. When the user apparatus 3a supports the measurement execution state, the active command unit 231 maintains a radio connection state with the user apparatus 3a. In the operation AD described below, the instruction transmitting unit 225 transmits the instruction signal to the user apparatus 3a.

When the user apparatus 3a does not support the measurement execution state, the active instruction unit 231 cuts radio connection with the user apparatus 3a. As a result, the user apparatus 3a returns to the idle state.

Figure 8:
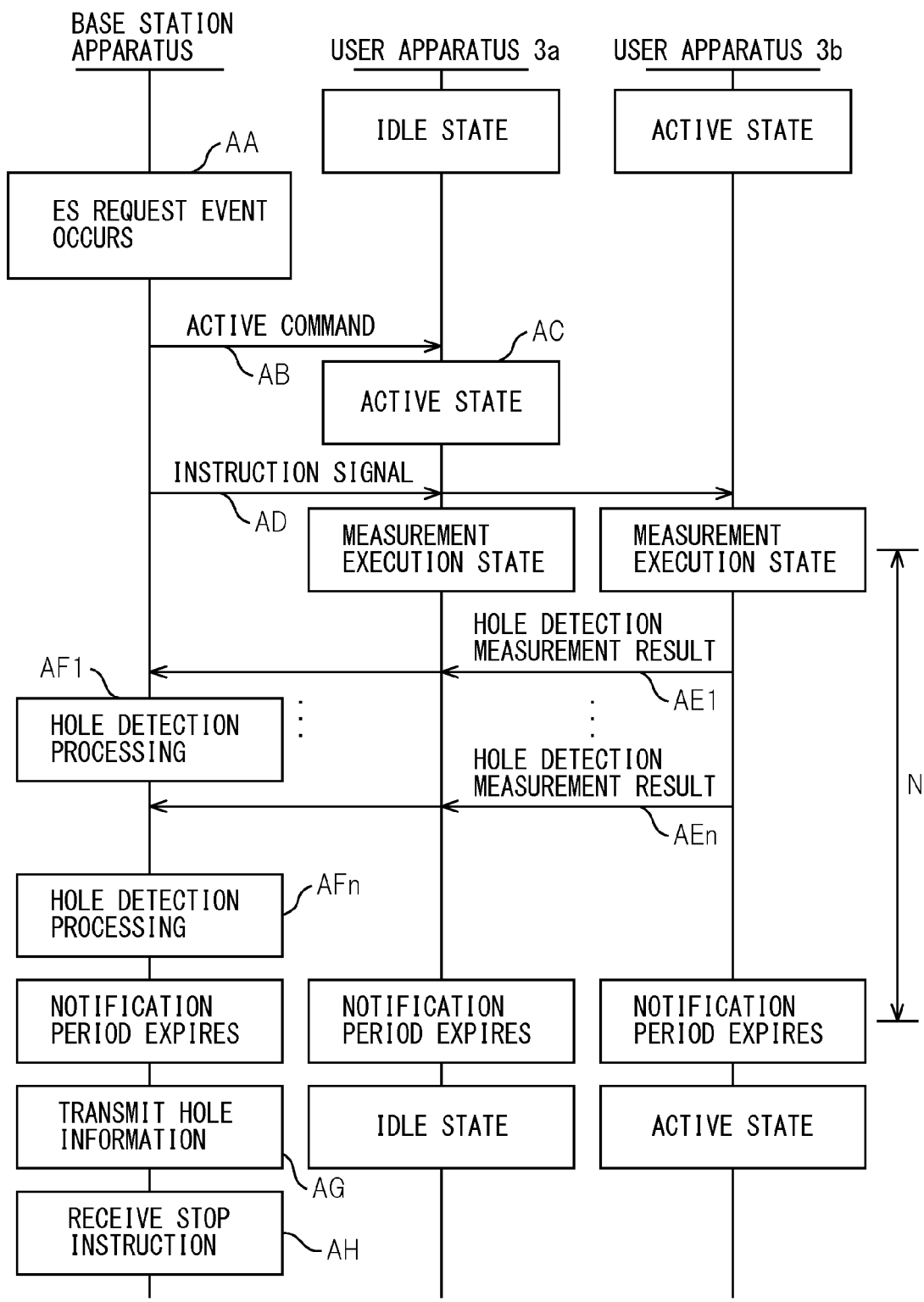
FIG. 8 is an explanatory diagram of a first example of processing in the communication system.

FIG. 8 will be referred. In the operation AD, the instruction transmitting unit 225 transmits the instruction signal to the user apparatus 3. When receiving the instruction signal, the user apparatus 3 transits to the measurement execution state. The instruction signal to be transmitted to the user apparatus 3a may include designation of an operation state for returning the operation state of the user apparatus 3a to the idle state after the expiration of the notification period N. Further, an instruction signal to be transmitted to the user apparatus 3b may include designation for returning the operation state of the user apparatus 3b to the active state after the expiration of the notification period N. During the notification period N after the transition to the measurement execution state, the user apparatus 3 transmits measurement results to the base station apparatus 2, which is the serving station, in the operations AE1 to AEn.

When the base station apparatus 2 receives the measurement results in the operations AE1 to AEn, in the operations AF1 to AFn, the hole detecting unit 228 detects a hole area which may be generated when a transmission output of the base station apparatus 2 is stopped, based on the measurement result. Detection processing of the hole detecting unit 228 will be described below.

Subsequently, when the notification period N expires, the measurement processing control unit 322 and the state changing unit 323 of the user apparatuses 3a and 3b return the user apparatuses 3a and 3b respectively to the idle state or the active state, according to the designation of the operation state included in the instruction signal.

In the operation AG, the hole information creating unit 229 generates hole information. The hole information creating unit 229 transmits the hole information to the server apparatus 4. The ES operation control unit 421 of the server apparatus 4 decides whether or not to stop the transmission output of the base station apparatus 2, based on the received hole information. The ES operation control unit 421 transmits the instruction to stop the transmission output to the base station apparatus 2 according to a decision result.

In the operation AH, the energy-saving operation control unit 230 receives the instruction to stop the transmission output. When the instruction to stop is received, the energy-saving operation control unit 230 stops the transmission output of the base station apparatus 2.

Figure 11:
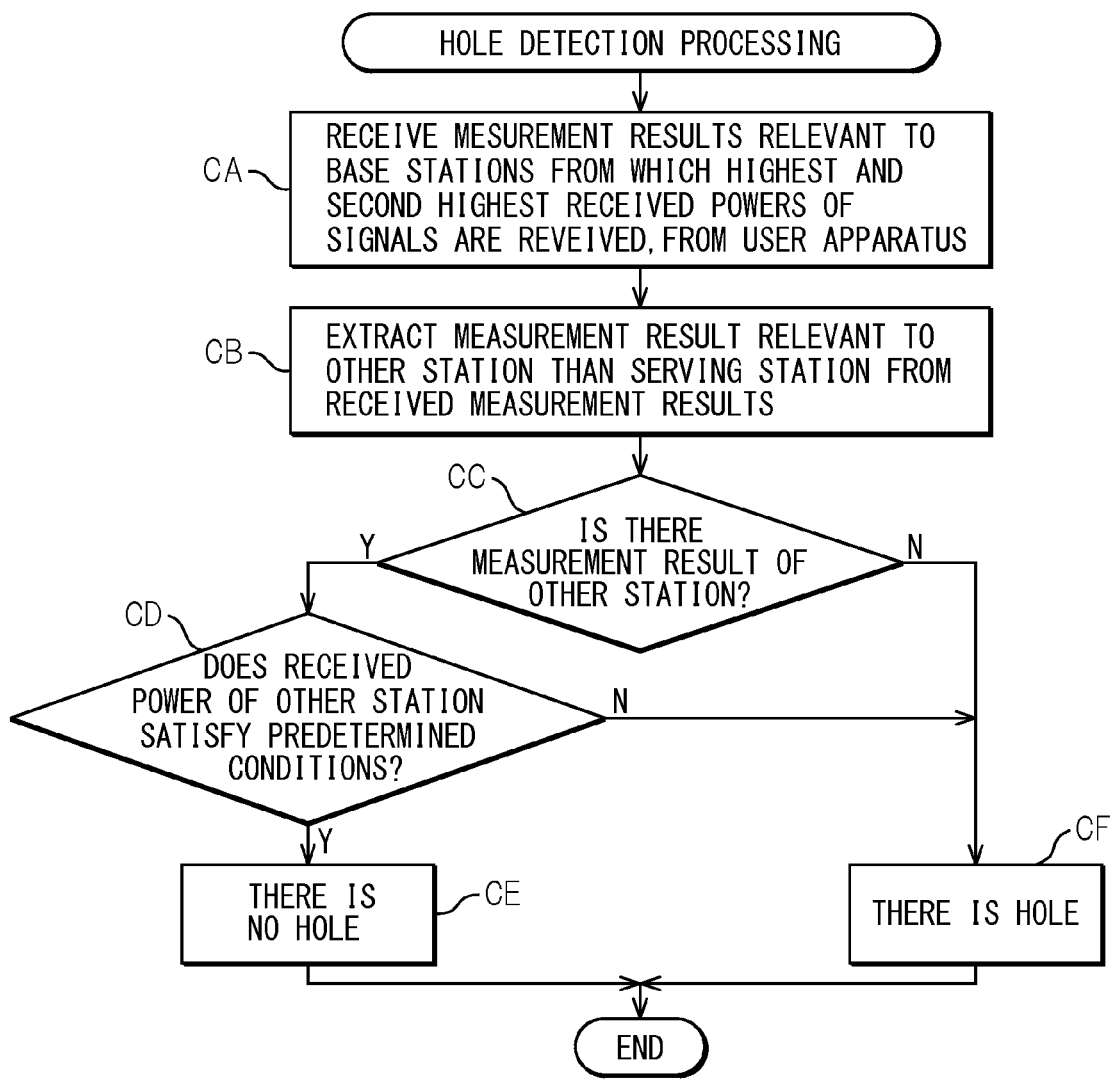
FIG. 11 is an explanatory diagram of a first example of hole detection processing.

Next, the first example of the hole detection processing of the hole detecting unit 228 will be illustrated with reference to FIG. 11. Note that each of the following operations CA to CF may be steps, in the other embodiments.

In this example, the serving station is supposed to be a base station apparatus from which the highest received power is measured or a base station apparatus from which the second highest received power is measured. Consequently, the received power from the base station apparatus other than the serving station among these base station apparatuses is the highest received power which the user apparatus 3 can receive when the serving station stops.

Hence, if the received power, which is the measurement result of a station other than the serving station among the base station apparatus from which the highest received power is measured and the base station apparatus from which the second highest received power is measured, satisfies desired intensity conditions, it is possible to estimate that a hole is not generated even when the serving station stops.

In this example, notifying measurement results relevant to "a base station apparatus from which the highest received power is measured and a base station apparatus from which a second highest received power is measured" is designated in the notification matter designation information. The user apparatus 3 transmits to the base station apparatus 2 the measurement results relevant to the base station apparatus from which the highest received power is measured and the base station apparatus from which the second highest received power is measured.

In the operation CA, the measurement result receiving unit 227 receives the measurement results transmitted from the user apparatus 3. In the operation CB, the hole detecting unit 228 extracts the measurement result included in the received measurement results, which is measured for another base station apparatus other than the base station apparatus itself 2, i.e., other than the serving station 2. For illustration of the following FIG. 11, the base station apparatus which is a serving station will be also referred to as the "base station apparatus 2*a*" and the other base station apparatus will be also referred to as the "base station apparatus 2*b*."

In the operation CC, the hole detecting unit 228 decides whether or not there is the measurement result relevant to the other base station apparatus 2*b*. When there is the measurement result relevant to the other base station apparatus 2*b* (operation CC: Y), processing proceeds to the operation CD. When there is no measurement result relevant to the other base station apparatus 2*b* (operation CC: N), processing proceeds to the operation CF.

In the operation CD, the hole detecting unit 228 decides whether or not the measured received power from the other base station apparatus 2*b* satisfies the predetermined intensity conditions. For example, the hole detecting unit 228 may decide whether or not the received power is a predetermined threshold or more. The predetermined intensity conditions can adopt various conditions for deciding the intensity of the received power. The same also applies to the other examples.

When the received power satisfies the predetermined intensity conditions (operation CD: Y), processing proceeds to the operation CE. When the received power does not satisfy the predetermined intensity conditions (operation CD: N), processing proceeds to the operation CF.

In the operation CE, the hole detecting unit 228 decides that generation of a hole area is not detected. Meanwhile, in the operation CF, the hole detecting unit 228 decides that generation of the hole area is detected.

Figure 12:
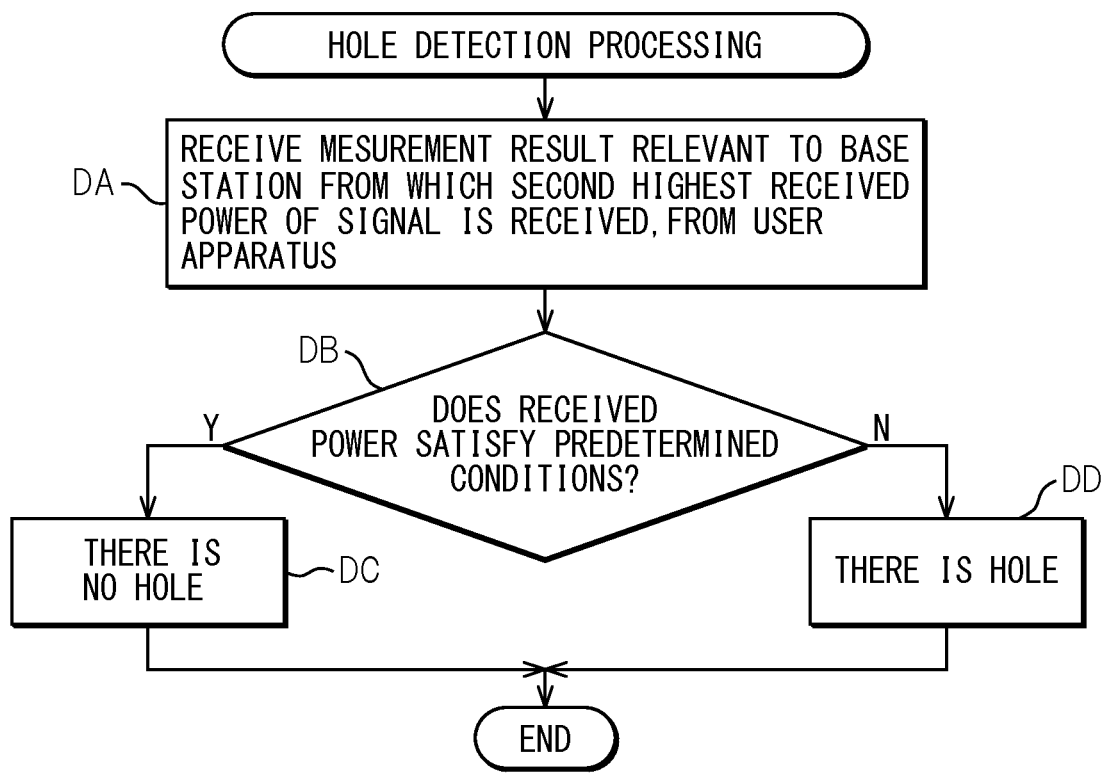
FIG. 12 is an explanatory diagram of a second example of hole detection processing.

Next, another example of hole detection processing of the hole detecting unit 228 will be illustrated. FIG. 12 is an explanatory diagram of the second example of the hole detection processing. Note that each of the following operations DA to DD may be steps, in the other embodiments.

In this example, the serving station is supposed to be a base station apparatus from which the highest received power is measured. Consequently, the second highest received power is the highest received power which the user apparatus 3 can receive if the serving station stops. Hence, when the second highest received power satisfies the desired intensity conditions, it is possible to estimate that a hole is not generated even when the serving station stops.

In this example, notifying a measurement result relevant to "a base station apparatus from which the second highest received power is measured" is designated in the notification matter designation information. The user apparatus 3 transmits to the base station apparatus 2 the measurement result relevant to the base station apparatus from which the second highest received power is measured.

In the operation DA, the measurement result receiving unit 227 receives the measurement result transmitted from the user apparatus 3. In the operation DB, the hole detecting unit 228 decides whether or not the received power in the received measurement result satisfies the predetermined intensity conditions. When the received power satisfies the predetermined intensity conditions (operation DB: Y), processing proceeds to the operation DC. When the received power does not satisfy the predetermined intensity conditions (operation DB: N), processing proceeds to the operation DD.

In the operation DC, the hole detecting unit 228 decides that generation of the hole area is not detected. In the operation DD, the hole detecting unit 228 decides that generation of the hole area is detected.

Figure 13:
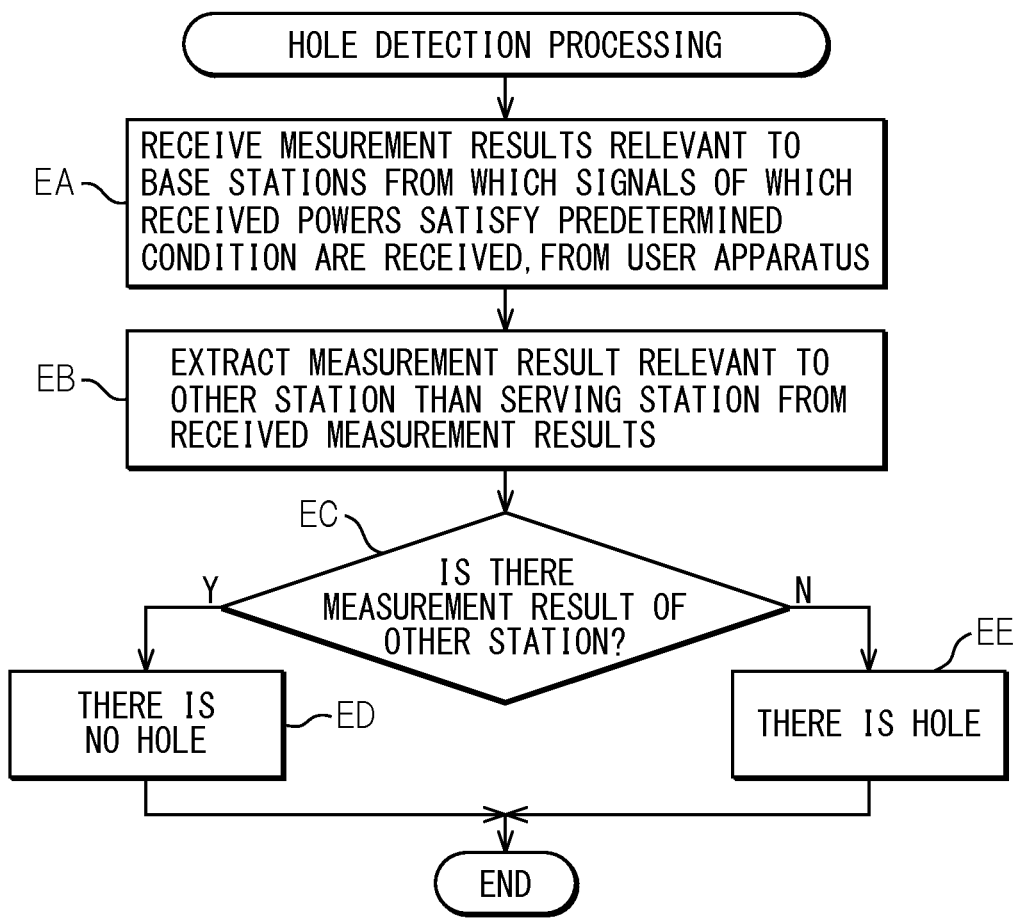
FIG. 13 is an explanatory diagram of a third example of hole detection processing.

Next, another example of the hole detection processing of the hole detecting unit 228 will be illustrated. FIG. 13 is an explanatory diagram of a third example of the hole detection processing. Note that each of the following operations EA to EE may be steps, in the other embodiments.

In this example, generation of the hole area is detected by deciding whether or not received power equal to or more than the desired intensity can be obtained from the base station apparatus other than the serving station. In this example, notifying a measurement result relevant to "a base station apparatus from which received power satisfying predetermined intensity conditions is measured" is designated in the notification matter designation information. The user apparatus 3 transmits to the base station apparatus 2 a measurement result relevant to the base station apparatus from which received power satisfying the predetermined intensity conditions is measured. For illustration of following FIG. 13, the base station apparatus which is a serving station will be also referred to as the "base station apparatus 2*a*" and another base station apparatus will be also referred to as the "base station apparatus 2*b*."

In the operation EA, the measurement result receiving unit 227 receives the measurement result transmitted from the user apparatus 3. In the operation EB, the hole detecting unit 228 extracts the measurement result included in the received measurement results and relevant to the other base station apparatus 2*b* other than the base station apparatus 2*a*.

In the operation EC, the hole detecting unit 228 decides whether or not there is the measurement result relevant to the other base station apparatus 2*b*. When there is the measurement result relevant to the other base station apparatus 2*b* (operation EC: Y), processing proceeds to the operation ED. When there is no measurement result relevant to the other base station apparatus 2*b* (operation EC: N), processing proceeds to the operation EE.

In the operation ED, the hole detecting unit 228 decides that generation of a hole area is not detected. Meanwhile, in the operation EE, the hole detecting unit 228 decides that generation of the hole area is detected.

According to the examples, it is possible to predict in advance generation of a hole area to be generated when a transmission output of a base station apparatus is stopped. Consequently, it is possible to predict generation of a hole area to be generated when a transmission output of the base station apparatus is stopped, and to reduce generation of the hole area without causing failure of an actual radio link.

Further, according to the examples, generation of a hole area is predicted according to received power of a user apparatus immediately before the base station apparatus stops a transmission output. Consequently, it is possible to dynamically decide generation of a hole area at a position at which the user apparatus actually exists. As a result, it is possible to reduce an occurrence of a radio link failure when the base station apparatus stops a transmission output.

Figure 14:
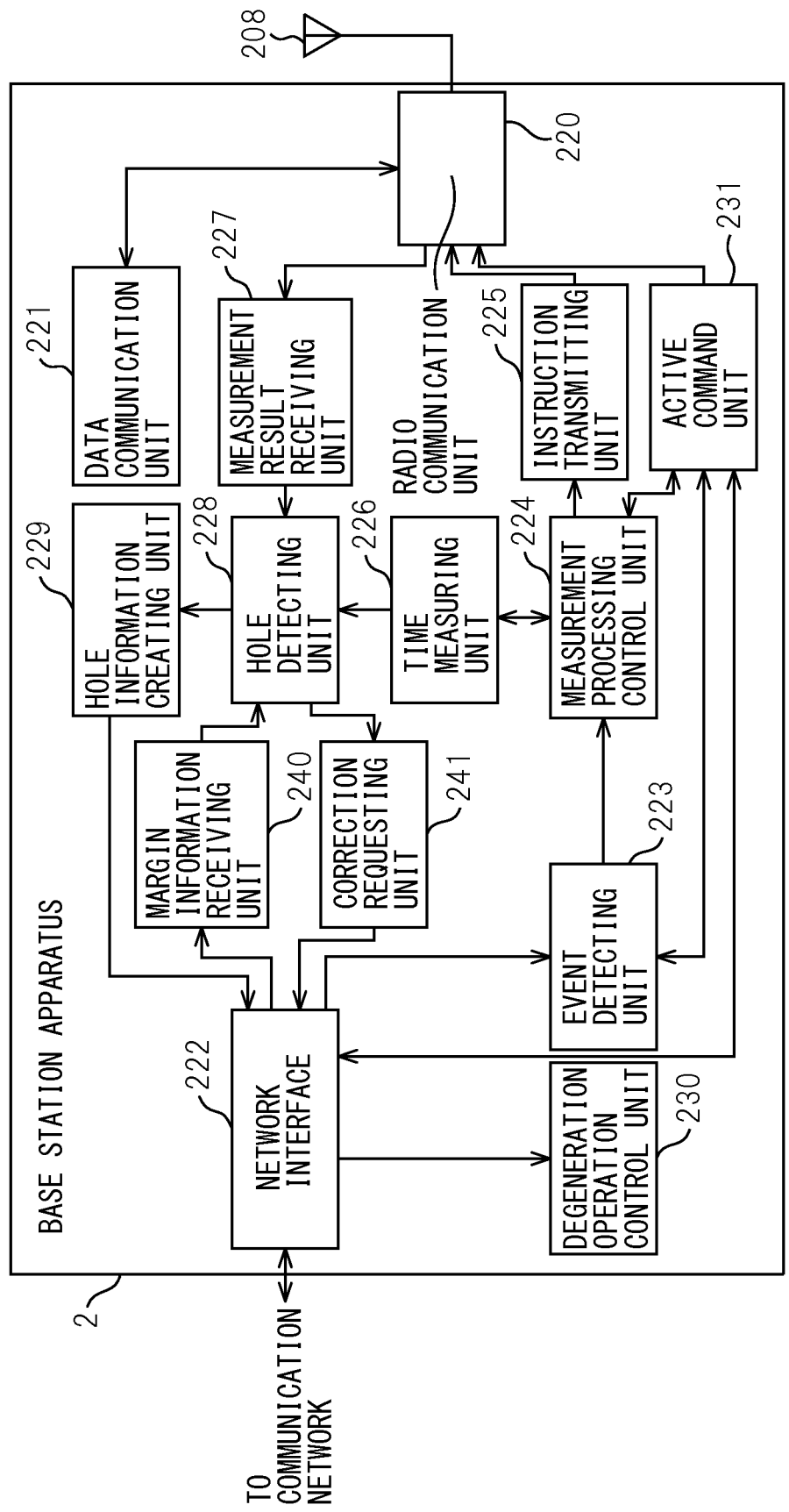
FIG. 14 is a configuration diagram of a second example of the base station apparatus.

Subsequently, another example of the base station apparatus 2 will be illustrated. FIG. 14 is a configuration diagram of the second example of the base station apparatus 2. The same components as the components depicted in FIG. 3 will be assigned the same reference numerals. Operations of the components to which the same reference numerals are assigned will be the same unless particularly illustrated. Further, the components depicted in FIG. 14 and functions thereof may be included in the other examples. In addition, for illustrations of FIG. 14 and FIG. 15, base station apparatus itself will be also referred to as the "base station apparatus 2a," and the other base station apparatus will be also referred to as the "base station apparatus 2b."

When deciding whether or not received power from the other base station apparatus 2b satisfies predetermined intensity conditions, the hole detecting unit 228 according to this example takes into account a current transmission power margin with respect to maximum transmission power of the other base station apparatus 2b. In other words, even when the received power in the measurement result received from the user apparatus 3 does not satisfy predetermined intensity conditions, if a value obtained by adding the transmission power margin to the received power in the measurement result satisfies the conditions, it is decided that a hole area is not generated.

Hence, the base station apparatus 2 includes a margin information receiving unit 240 and a correction requesting unit 241. The margin information receiving unit 240 receives margin information which indicates a transmission power margin from the other base station apparatus 2b. When received power in a measurement result relevant to the given base station apparatus 2b does not satisfy predetermined intensity conditions, and a value obtained by adding the transmission power margin to this received power satisfies the conditions, the correction requesting unit 241 requests this base station apparatus 2b to correct transmission power to increase transmission power.

Figure 15:
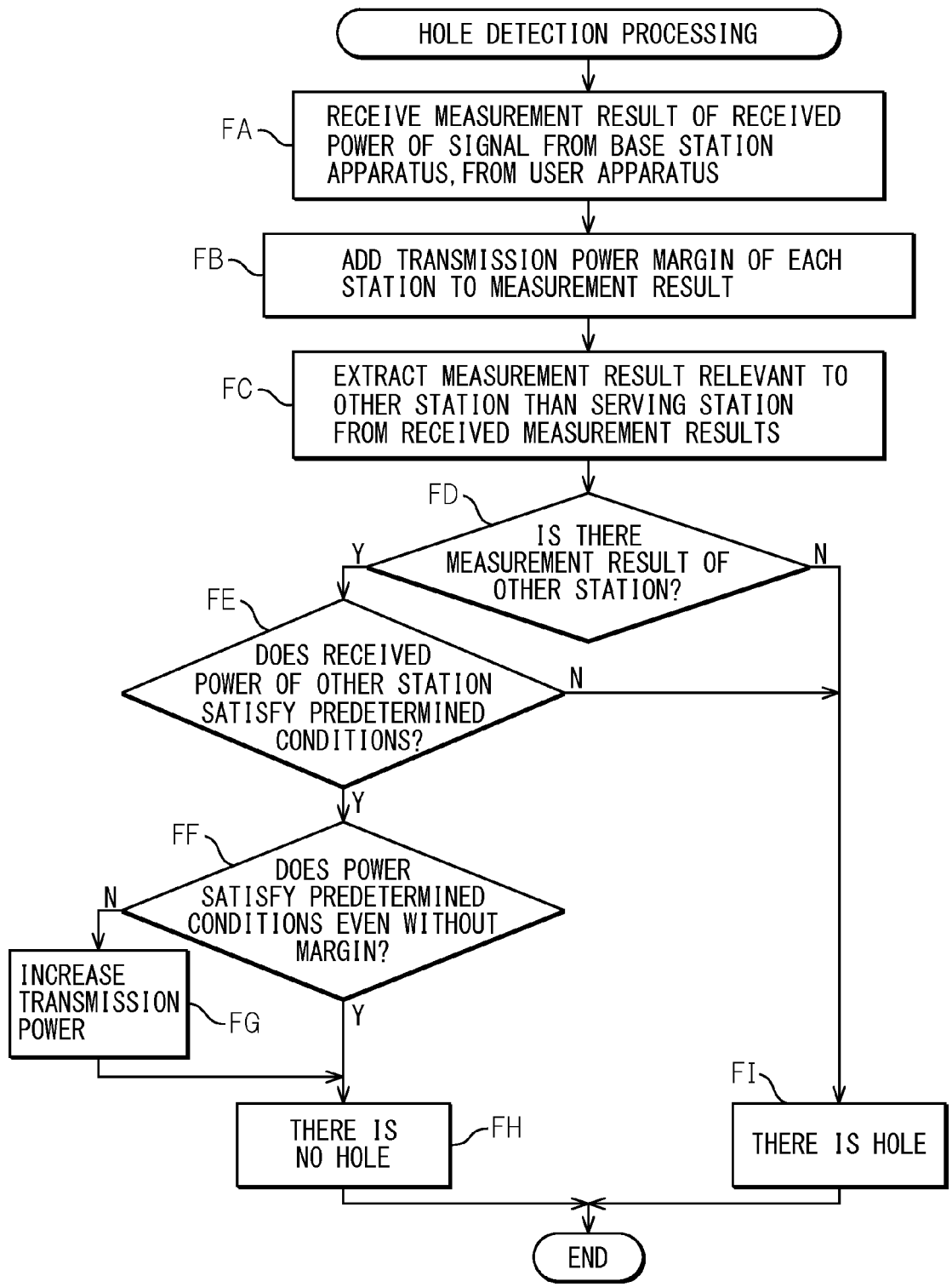
FIG. 15 is an explanatory diagram of a fourth example of hole detection processing.

FIG. 15 is an explanatory diagram of a fourth example of the hole detection processing. Note that each of the following operations FA to FI may be steps in the other embodiments. In the operation FA, the measurement result receiving unit 227 receives the measurement results transmitted from the user apparatus 3.

In the operation FB, the hole detecting unit 228 adds the transmission power margin of each base station apparatus 2 to the received intensity in the received measurement results. In the operation FC, the hole detecting unit 228 extracts the measurement result relevant to the other base station apparatus 2b included in the received measurement results.

In the operation FD, the hole detecting unit 228 decides whether or not there is a measurement result relevant to the other base station apparatus 2b. When there is the measurement result relevant to the other base station apparatus 2b (operation FD: Y), processing proceeds to the operation FE. When there is no measurement result relevant to the other base station apparatus 2b (operation FD: N), processing proceeds to the operation FI.

In the operation FE, the hole detecting unit 228 decides whether or not the measured received power from the other base station apparatus 2b satisfies the predetermined intensity conditions. When the received power satisfies the predetermined intensity conditions (operation FE: Y), processing proceeds to the operation FF. When the received power does not satisfy the predetermined intensity conditions (operation FE: N), processing proceeds to the operation FI.

In the operation FF, the hole detecting unit 228 decides whether or not the predetermined intensity conditions are satisfied without adding the transmission power margin thereto. When the predetermined intensity conditions are satisfied without adding the margin thereto (operation FF: Y), processing proceeds to the operation FH. When the predetermined intensity conditions are not satisfied without the margin (operation FF: N), processing proceeds to the operation FG.

In the operation FG, the correction requesting unit 241 requests the other base station apparatus 2b to correct transmission power to increase the transmission power. Subsequently, processing proceeds to the operation FH. In the operation FH, the hole detecting unit 228 decides that generation of the hole area is not detected. Meanwhile, in the operation FI, the hole detecting unit 228 decides that generation of the hole area is detected.

According to the example, when a hole area is detected based only on measurement results of the user apparatus 3, even if stopping a transmission power of the base station apparatus 2a is halted, it is possible to prevent generation of the hole area by correcting the transmission power of the other base station apparatus 2b. Consequently, it is possible to reduce occasions that stopping the transmission power of the base station apparatus 2a is halted due to detection of the hole area.

Figure 16:
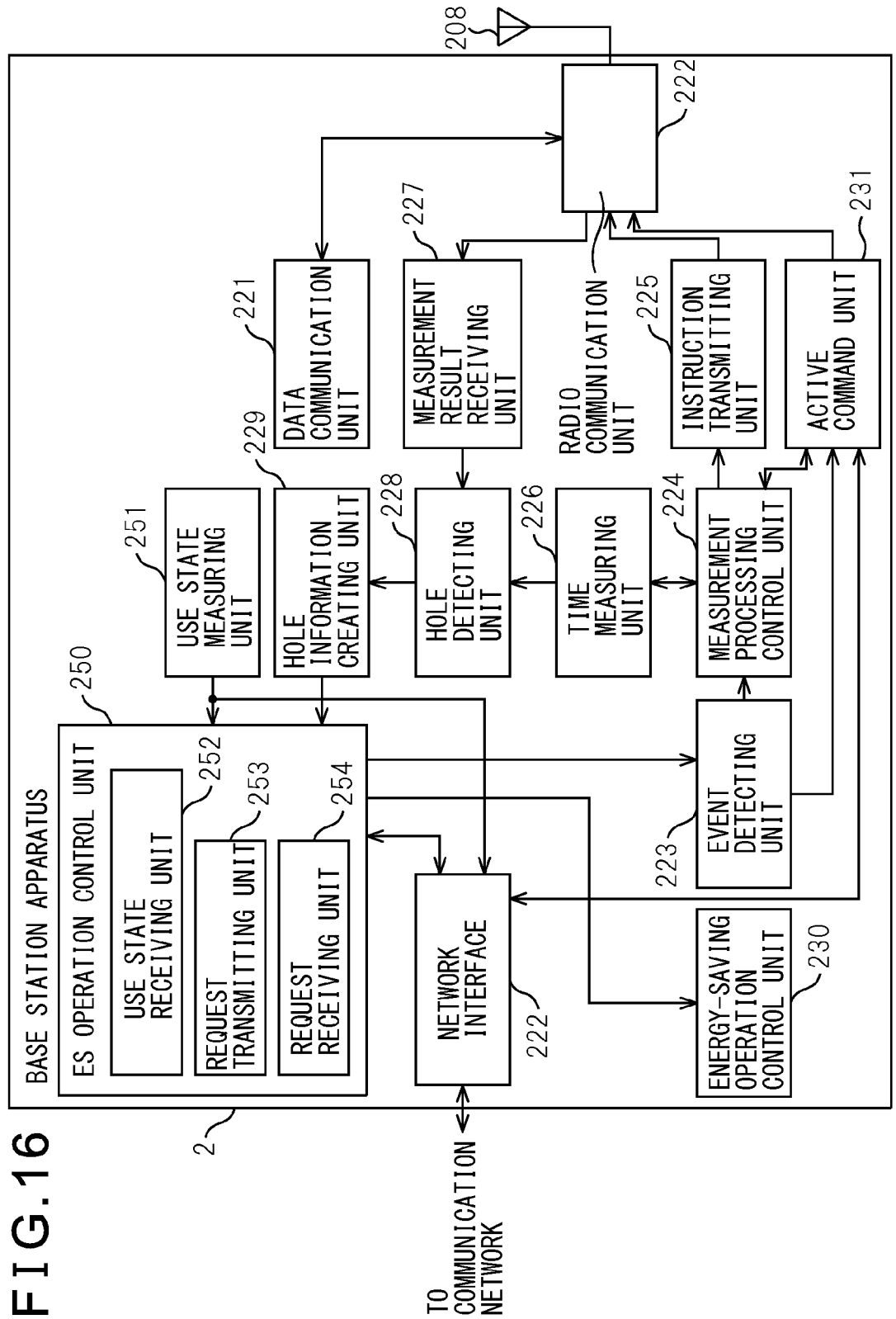
FIG. 16 is a configuration diagram of a third example of the base station apparatus.

Next, another example of the base station apparatus 2 will be illustrated. FIG. 16 is a configuration diagram of a third example of the base station apparatus 2. The same components as the components depicted in FIG. 3 will be assigned the same reference numerals. Operation of the components to which the same reference numerals are assigned will be the same unless illustrated. Further, the components depicted in FIG. 16 and functions thereof may be included in the other examples.

The base station apparatus 2 according to this example decides whether or not to stop a transmission output from the base station apparatus 2, based on hole information created by the hole information creating unit 229. Hence, the base station apparatus 2 includes an ES operation control unit 250 and a use state measuring unit 251. The ES operation control unit 250 may be an example of an output availability deciding unit. In addition, in this example, the base station apparatus 2 decides whether or not to stop a transmission output based on hole information, therefore the server apparatus 4 may be removed from the communication system 1.

The use state measuring unit 251 measures a radio resource use rate of the base station apparatus 2. The use state measuring unit 251 outputs the measurement result to the ES operation control unit 250. The use state measuring unit 251 transmits the measurement result to other neighboring base station apparatuses 2 through the network interface 222. In addition, for illustration of FIG. 16, base station apparatus itself will be also referred to as the "base station apparatus 2a," and other base station apparatuses will be also referred to as the "base station apparatus 2b".

The ES operation control unit 250 includes a use state receiving unit 252 which receives the measurement result of the radio resource use rate received from the other neighboring base station apparatus 2b. The ES operation control unit 250 causes an ES request event based on the radio resource use rate of the base station apparatus 2a and the radio resource use rate of the other neighboring base station apparatus 2b. In response to the occurrence of the ES request event, the hole information creating unit 229 generates hole information.

The ES operation control unit 421 decides whether or not to stop a transmission output from the base station apparatus 2a, based on the received hole information. When a transmission output from the base station apparatus 2a is stopped, the ES operation control unit 250 transmits output stop information indicating that the transmission output is stopped, to the other base station apparatus 2b through the network interface 222. The ES operation control unit 421 makes the energy-saving operation control unit 230 stop the transmission output of the base station apparatus 2a.

Further, when the other base station apparatus 2b stops a transmission output, the ES operation control unit 421 receives the output stop information from the other base station apparatus 2b.

The ES operation control unit 421 includes a request transmitting unit 253 which, when the radio resource use rate of the base station apparatus 2a is not in a predetermined range, transmits a request signal requesting a transmission output from the other base station apparatus 2b which is stopping an output.

Further, the ES operation control unit 421 includes the request receiving unit 254 which receives a request signal transmitted from the other base station apparatus 2b. When the request signal is received from the other base station apparatus 2b, the ES operation control unit 421 has the energy-saving operation control unit 230 resume a transmission output of the base station apparatus 2a. Note that these request signals may be transmitted and received through the network interface 222.

In the example, the base station apparatus 2 decides whether or not to stop a transmission output based on hole information, so that it is possible to remove the server apparatus 4 from the communication system 1 and disperse decision as to whether or not to stop a transmission output, to each base station apparatus 2.

Figure 17:
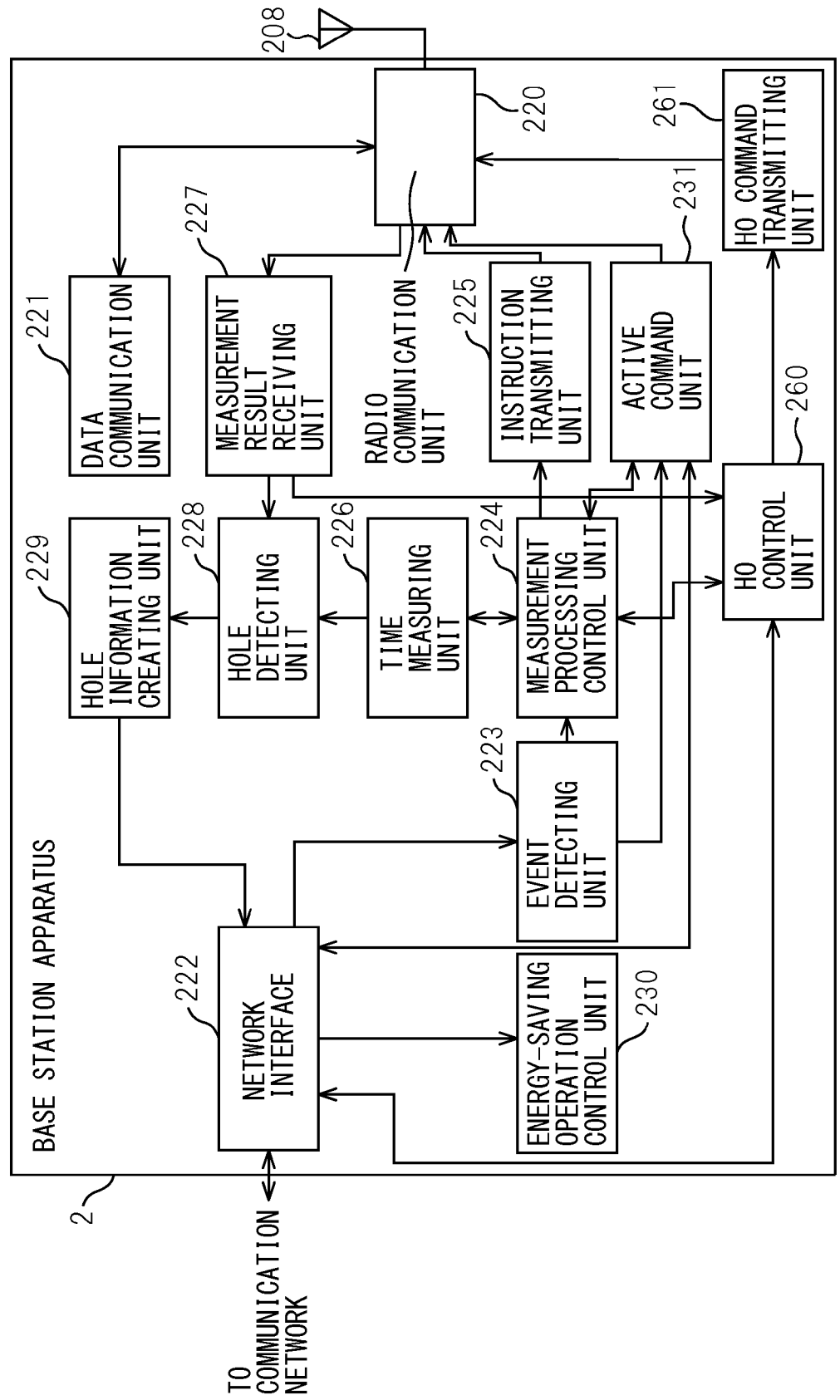
FIG. 17 is a configuration diagram of a fourth example of the base station apparatus.

Subsequently, another example of the base station apparatus 2 and the user apparatus 3 will be illustrated. FIG. 17 is a configuration diagram of a fourth example of the base station apparatus 2. The same components as the components depicted in FIG. 3 will be assigned the same reference numerals. Operations of the components to which the same reference numerals are assigned will be the same unless particularly illustrated. Further, the components depicted in FIG. 17 and functions thereof may be included in the other examples.

Figure 18:
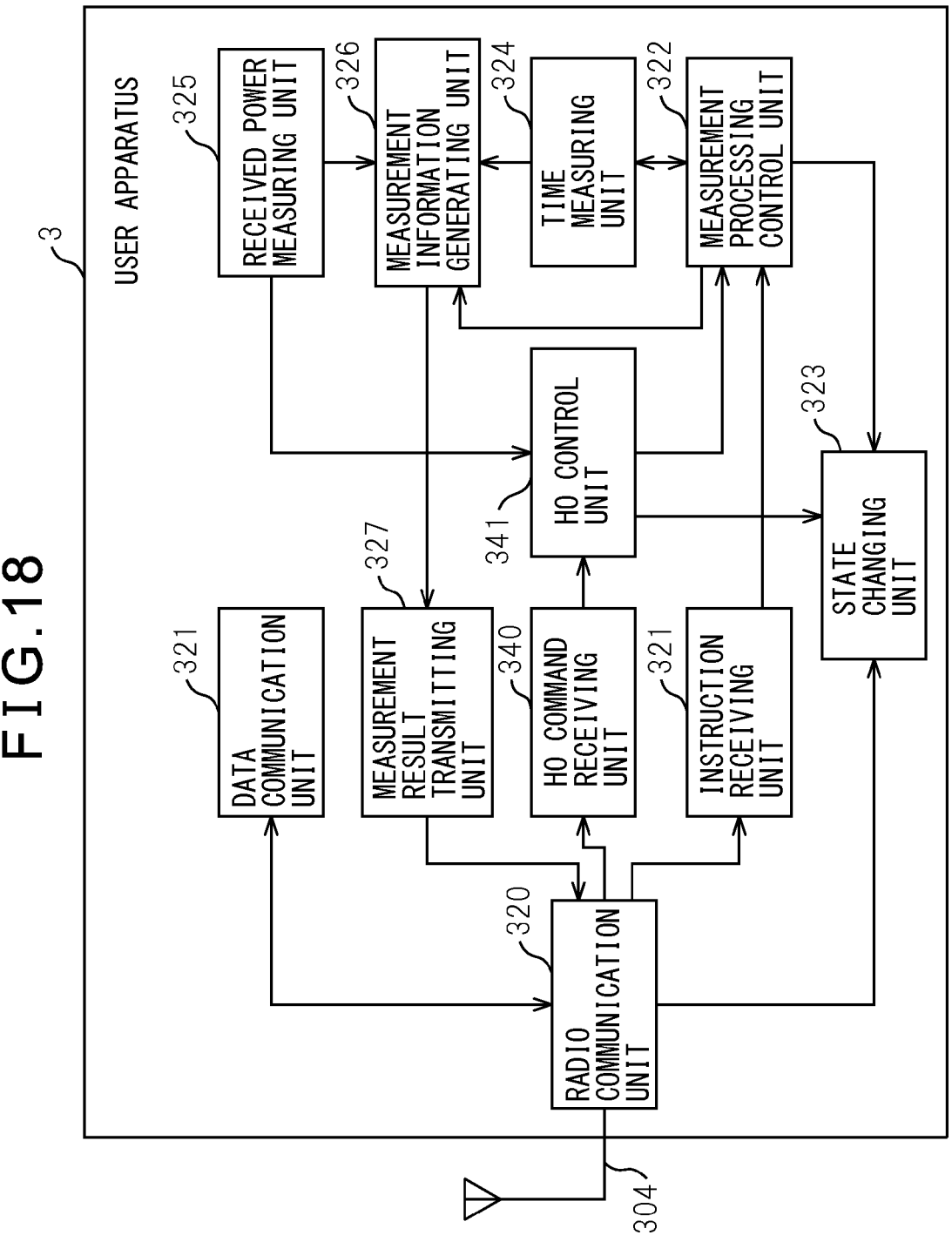
FIG. 18 is a configuration diagram of a second example of the user apparatus.

Furthermore, FIG. 18 is a configuration diagram of a second example of the user apparatus 3. The same components as the components depicted in FIG. 5 will be assigned the same reference numerals. The operations of the components to which the same reference numerals are assigned will be the same unless illustrated. Further, the components depicted in FIG. 18 and functions thereof may be included in the other examples.

In this example, the user apparatus 3 returns from the measurement execution state to the original operation state before the notification period N expires, when the user apparatus 3 in the measurement execution state is handed over from a cell of the serving station 2a to a cell of the other base station apparatus 2b. In addition, handover in the accompanying drawings will be referred to as "HO."

Further, in this example, the base station apparatus 2a decides whether or not handover is available according to a remaining time by a scheduled time to stop a transmission output, when the user apparatus 3 is handed over from the cell of the other base station apparatus 2b to the cell of the base station apparatus 2a which executes hole detection processing.

Hence, the base station apparatus 2 includes a handover control unit 260 and a handover command transmitting unit 261. Further, the user apparatus 3 includes a handover command receiving unit 340 and a handover control unit 341. The handover control unit 260 may be an example of a handover availability deciding unit and an instructing unit.

Figure 19:
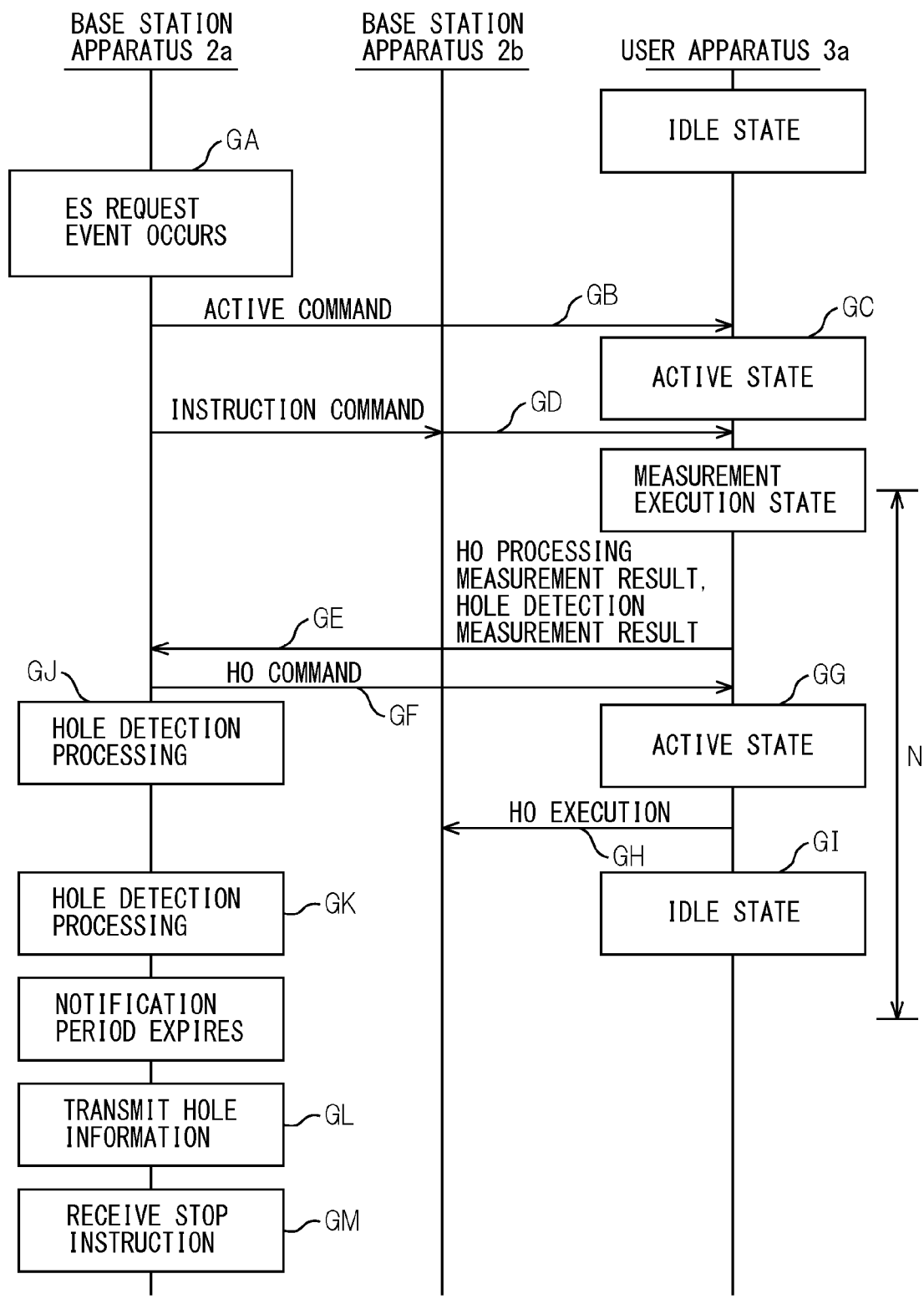
FIG. 19 is an explanatory diagram (Part 1) of an example of processing when performing a handover.

Hereinafter, operations of the handover control unit 260, the handover command transmitting unit 261, the handover instruction receiving unit 340 and the handover control unit 341 in the handover processing will be illustrated with reference to FIG. 19 to FIG. 22. FIG. 19 is an explanatory diagram of processing when the user apparatus 3 in the measurement execution state is handed over from the cell of the serving station 2a to the cell of the other base station apparatus 2b. Note that each of the following operations GA to GM may be steps, in the other embodiments.

In the operation GA, the event detecting unit 223 of the base station apparatus 2a detects an occurrence of an ES request event. At this point of time, the user apparatus 3a is in the idle state. In the operation GB, the active command unit 231 transmits an active command to the user apparatus 3a. In the operation GC, the user apparatus 3a transits to the active state.

In the operation GD, the instruction transmitting unit 225 transmits an instruction signal to the user apparatus 3. When receiving the instruction signal, the user apparatus 3a transits to the measurement execution state. When the notification period N starts after the user apparatus 3a transits to the measurement execution state, the user apparatus 3a notifies the measurement results obtained by measuring received power from the base station apparatus 2, to the base station apparatus 2a, in the operation GE.

The measurement results notified from the user apparatus 3a to the base station apparatus 2a include a measurement result used for detection processing by the hole detecting unit 228 and a measurement result utilized to decide handover by the handover control unit 260. The handover control unit 260 inputs a measurement result for deciding handover which is received by the measurement result receiving unit 227.

In the operation GF, the handover control unit 260 determines execution of handover of the user apparatus 3a from the base station apparatus 2a to the base station apparatus 2b. The handover command transmitting unit 261 transmits a handover command of handing over the user apparatus 3a from the base station apparatus 2a to the base station apparatus 2b, to the user apparatus 3a.

In the operation GG, the handover command receiving unit 340 of the user apparatus 3a receives the handover command. The handover command receiving unit 340 notifies reception of the handover command to the handover control unit 341. When the handover command is received, the handover control unit 341 makes the state changing unit 323 transit the operation state of the user apparatus 3 to a handover active state even before the expiration of the notification period N. As a result, the measurement information generating unit 326 and the measurement result transmitting unit 327 stop notifying the measurement results.

In the operation GH, the handover control unit 341 executes handover processing from the base station apparatus 2a to the base station apparatus 2b. When handover processing is finished, in the operation GI, the measurement processing control unit 322 and the state changing unit 323 makes the user apparatus 3a return to the idle state according to designation of the operation state included in the instruction signal.

Similar to AF1 to AFn, AG and AH depicted in FIG. 8, in the operations GJ to GN, the base station apparatus 2a detects a hole area, generates and transmits hole information, receives a stop instruction of a transmission output and stops a transmission output of the base station apparatus 2.

When the user apparatus 3 leaves the cell of the base station apparatus 2a which is executing hole detection processing by handover, measurement results obtained by the user apparatus 3 are not necessary. According to the example, by returning such operation state of the user apparatus 3 from the measurement execution state to the original state, it is possible to remove wasteful measurement processing and notification processing, and save radio resources which are necessary for notification.

Next, processing when the user apparatus 3 is handed over from the cell of the other base station apparatus 2b to the cell of the base station apparatus 2a which is executing hole detection processing will be illustrated with reference to FIG. 20. Note that each of the following operations HA to HM may be steps, in the other embodiments.

In the operation HA, the event detecting unit 223 of the base station apparatus 2a detects an occurrence of an ES request event. In this example, the user apparatus 3a is in an active state at this point of time, and is positioned in the cell of the base station apparatus 2b. In the operation HB, the user apparatus 3a notifies the measurement result for deciding handover to the base station apparatus 2b.

In the operation HC, the base station apparatus 2b refers to the base station apparatus 2a about whether or not handover is available. In the operation HD, the handover control unit 260 of the base station apparatus 2a decides whether or not handover is available. Handover availability decision processing of the handover control unit 260 will be described below.

When the handover control unit 260 permits handover, in the operation HE, the handover control unit 260 transmits a permit signal which notifies permission of handover to the base station apparatus 2b through the network interface 222. Further, similarly, the handover control unit 260 transmits to the base station apparatus 2b timer information which designates a period M which is determined according to a remaining period by a time when a transmission output is stopped.

The timer information is designation information of a period in which the user apparatus 3a, handed over to the base station apparatus 2a, notifies measurement results of received powers from the base station apparatus 2, to the base station apparatus 2a. In the operation HF, the base station apparatus 2b transmits the permit signal and the timer information to the user apparatus 3a.

When the permit signal is received, the handover control unit 341 of the user apparatus 3a executes handover processing from the base station apparatus 2b to the base station apparatus 2a in the operation HG.

When the timer information is received, the instruction receiving unit 321 notifies the timer information to the measurement processing control unit 322. The measurement processing control unit 322 makes the state changing unit 323 transit the operation state of the user apparatus 3 from the active state to the measurement execution state. The measurement processing control unit 322 outputs the timer information to the time measuring unit 324. The time measuring unit 324 decides whether or not the period M indicated by the timer information passes.

In the operations HI1 to HIn, the user apparatus 3a transmits the measurement results respectively to the base station apparatus 2a during the period M. When the base station apparatus 2a receives the measurement results, in the operations HJ1 to HJn, the hole detecting unit 228 detects a hole area which may be generated when a transmission output from the base station apparatus 2a is stopped, based on the measurement result.

When the period M passes, in the operations HK and HL, the base station apparatus 2a generates and transmits hole information, receives an instruction to stop a transmission output and stops the transmission output of the base station apparatus 2, in the same manner as AG and AH depicted in FIG. 8. Further, in the operation HM, the measurement processing control unit 322 and the state changing unit 323 return the user apparatus 3a to the original active state.

Figure 20:
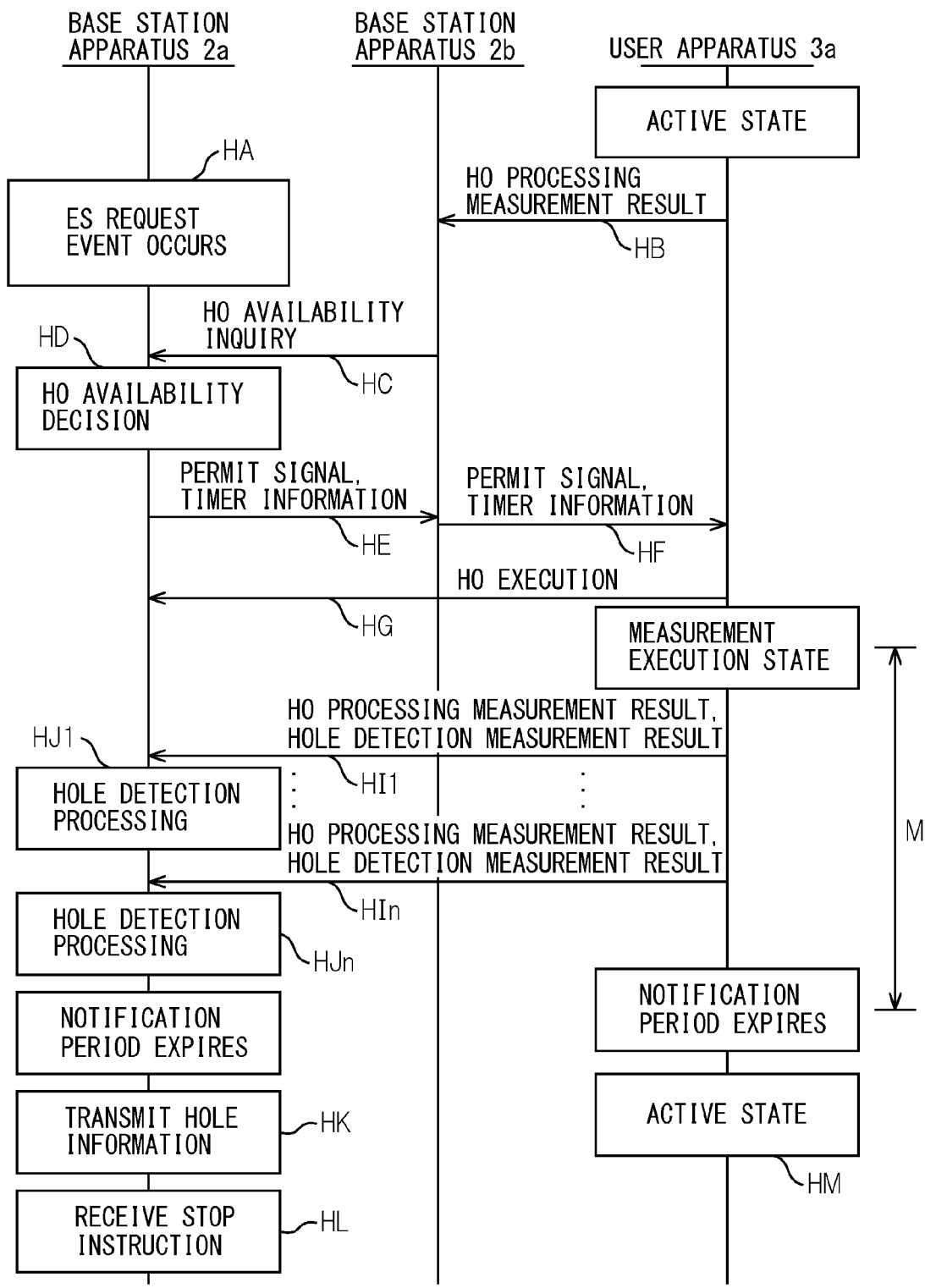
FIG. 20 is an explanatory diagram (Part 2) of an example of processing when performing the handover.
Figure 21:
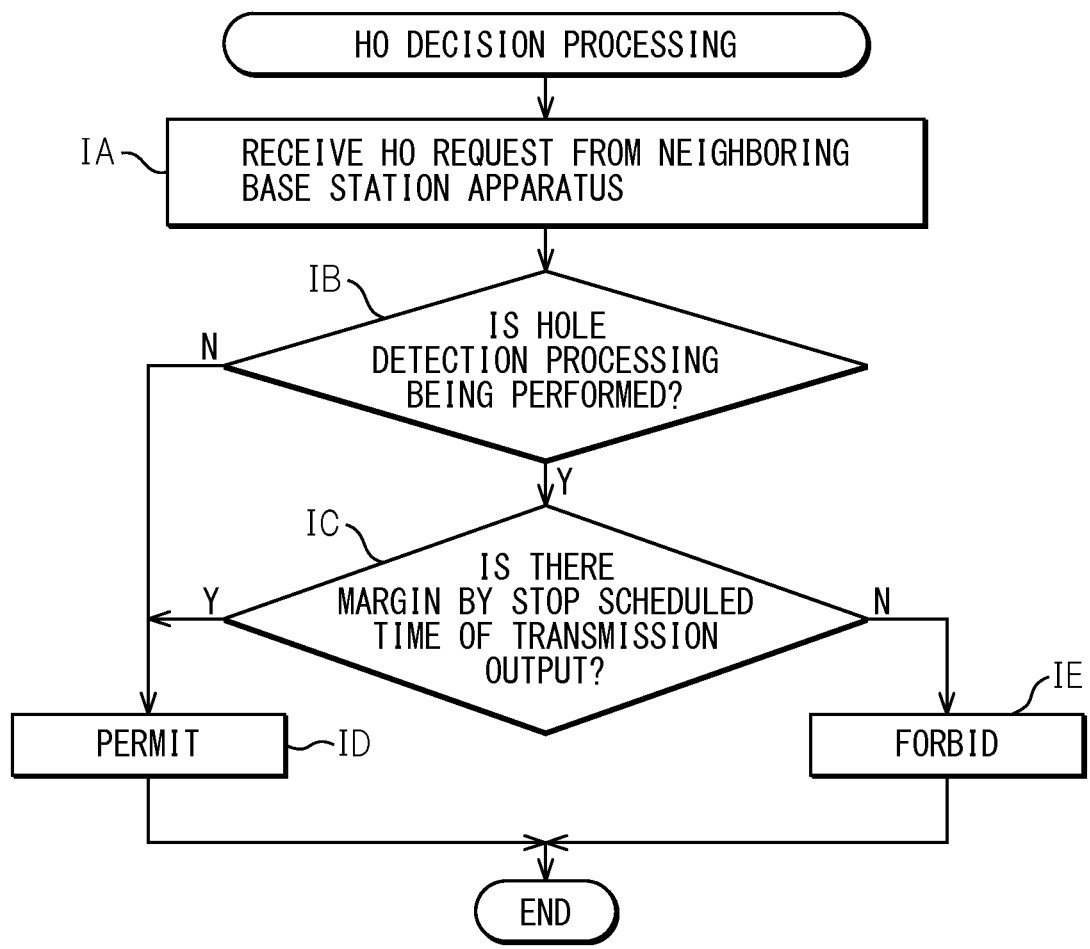
FIG. 21 is an explanatory diagram of processing of deciding whether or not handover is available.

Next, processing of deciding whether or not handover is available in the operation HD in FIG. 20 will be illustrated. FIG. 21 is an explanatory diagram of processing of deciding whether or not handover is available. Note that each of the following operations IA to IE may be steps, in the other embodiments.

In the operation IA, the base station apparatus 2a receives from the base station apparatus 2b the reference as to whether or not the user apparatus 3a can be handed over. In the operation IB, the handover control unit 260 of the base station apparatus 2a refers to the measurement processing control unit 224 about whether or not the base station apparatus 2a is performing processing of detecting a hole area.

When the base station apparatus 2a is performing processing of detecting a hole area (operation IB: Y), processing proceeds to the operation IC. When the base station apparatus 2a is not performing processing of detecting a hole area (operation IB: N), processing proceeds to the operation ID.

In the operation IC, the handover control unit 260 decides whether or not there is an extra remaining period by a scheduled time when a transmission output is stopped. For example, the handover control unit 260 decides whether or not the remaining period by the scheduled time when the transmission output is stopped is longer than a connection processing time in a handover process. When there is an extra remaining period (operation IC: Y), processing proceeds to the operation ID. When there is no extra remaining period (operation IC: N), processing proceeds to the operation IE.

In the operation ID, the handover control unit 260 permits handover. Meanwhile, in the operation IE, the handover control unit 260 forbids handover.

FIG. 22 depicts processing when handover is forbidden. Note that each of the following operations HA to HD, HJ to HL and HN may be steps, in the other embodiments. The operations HA to HD and HJ to HL are the same as the operations HA to HD and HJ to HL depicted in FIG. 20, respectively. When the handover control unit 260 forbids handover in the operation HD, the handover control unit 260 transmits a handover forbid signal to the base station apparatus 2b in the operation HN.

As a result, the base station apparatus 2b does not start handover processing of the user apparatus 3a, and handover of the user apparatus 3a is not executed.

According to the example, when a user apparatus is handed over after an ES request event occurs, whether or not handover is possible is decided according to a remaining time by a stop scheduled time of a transmission output. Consequently, it is possible to prevent a ping-pong phenomenon caused when a transmission output of the base station apparatus 2 is stopped during handover connection processing.

According to the example, it is possible to receive a notification of measurement results from a user apparatus which is handed over after an ES request event occurs. Consequently, it is possible to enhance precision of detecting a hole.

The apparatus or the method disclosed herein can prevent a hole area from being generated when a transmission output of a base station is stopped.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A communication system comprising: a plurality of base station apparatuses which includes at least a first base station apparatus and a second base station apparatus; and a mobile base station, wherein
the mobile station apparatus comprises:
a measuring unit which measures each received power from the plurality of base station apparatuses; and
a measurement result notifying unit which notifies a measurement result of the received power to a base station apparatus which covers a cell in which the mobile base station apparatus is positioned, among the plurality of base station apparatuses; and
the first base station apparatus comprises:
a measurement result receiving unit which receives the measurement result notified when the mobile station apparatus is positioned in a cell of the first base station apparatus; and
a hole detecting unit which, based on a measurement result obtained from the mobile station apparatus by measuring received power which is received from the surrounding base station apparatus including the first base station apparatus, detects a hole area to be generated provided that any other base station apparatus measured information except the first base station apparatus are not received after a transmission power from the first base station apparatus is switched off.

2. The communication system according to claim 1, wherein
the measurement result notifying unit notifies a measurement result of received power from a base station apparatus from which a highest received power of signal is received, and a measurement result of received power from a base station apparatus from which a second highest received power of signals is received.

3. The communication system according to claim 2, wherein
the hole detecting unit decides that a hole area is to be generated, provided that any other base station apparatus measured information except the first base station apparatus are not received.

4. The communication system according to claim 2, wherein
the hole detecting unit decides that a hole area is to be generated, provided that received power from base station apparatus except the first base station does not satisfy a predetermined required strength.

5. The communication system according to claim 1, wherein
the measurement result notifying unit notifies a measurement result of received power from a base station apparatus from which a second highest received power of signal is received.

6. The communication system according to claim 5, wherein
the hole detecting unit decides that a hole area is to be generated, provided that the measurement result of received power from a base station apparatus notified from the mobile station apparatus, does not satisfy a predetermined required strength.

7. The communication system according to claim 1, wherein
the measurement result notifying unit at the mobile terminal apparatus notifies a measurement result of received power from a base station apparatus, provided that received power from the base station apparatus satisfies a predetermined required strength.

8. The communication system according to claim 7, wherein
the hole detecting unit decides that a hole area is to be generated, provided that a measurement result of received power from any other base station apparatus measured information except the first base station apparatus are not received.

9. The communication system according to claim 1, wherein
the first base station apparatus comprises an instruction transmitting unit which transmits an instruction signal which instructs the mobile station apparatus, positioned in a cell of the first base station apparatus, to notify the measurement result.

10. The communication system according to claim 9, wherein
the instruction signal includes designation of a condition as to select a base station among of the plurality of base station apparatuses, wherein the measurement result of received power from the selected base station is transmitted to the first base station apparatus.

11. The communication system according to claim 9, wherein
the first base station apparatus comprises an event detecting unit which detects an event which makes a request to switch off a transmission power from the first base station apparatus; and
the instruction transmitting unit transmits the instruction signal when the event is detected.

12. The communication system according to claim 11, wherein
the mobile station apparatus comprises at least two states of an active state in which the measurement result can be transmitted, and an idle state in which the measurement result is incapable of being transmitted; and
the instruction transmitting unit transmits the instruction signal only to the mobile station apparatus which is in the active state when the event is detected.

13. The communication system according to claim 11, wherein
the mobile station apparatus comprises at least two states of an active state in which the measurement result can be transmitted, and an idle state in which the measurement result is incapable of being transmitted;
the first base station apparatus comprises an active command unit which makes the mobile station apparatus in the idle state transit to the active state in response to a detection of the event; and
the instruction transmitting unit transmits the instruction signal to the mobile station apparatus which transits to the active state by means of the active command unit.

14. The communication system according to claim 9, wherein
the instruction signal includes designation of a notification period in which the mobile station apparatus notifies the measurement result;
the mobile station apparatus comprises a time measuring unit which detects that the notification period has passed; and the measurement result notifying unit stops notifying the measurement result when the notification period has passed.

15. The communication system according to claim 9, wherein
the measurement result notifying unit stops notifying the measurement result when the mobile station apparatus is handed over from a cell of the first base station apparatus to a cell of the second base station apparatus.

16. The communication system according to claim 11, wherein
the first base station apparatus comprises a handover availability deciding unit which decides whether or not the mobile station apparatus can be handed over from a cell of the second base station apparatus to a cell of the first base station apparatus, according to a remaining period by a time when the transmission power is switched off.

17. The communication system according to claim 16, wherein
the first base station apparatus comprises an instructing unit which transmits a signal instructing the mobile station apparatus, which is to be handed over to the cell of the first base station apparatus, to notify the measurement result, to the mobile station apparatus through the second base station apparatus; and
the signal transmitted from the instructing unit includes designation of the notification period determined according to the remaining period.

18. The communication system according to claim 1, wherein
the first base station apparatus comprises a margin information receiving unit which receives information related to a margin of transmission power of the other base station apparatus, from the other base station apparatus; and
the hole detecting unit detects the hole area based on a value on which the margin is added to the measured received power from the other base station apparatus.

19. The communication system according to claim 1, wherein
the first base station apparatus comprises an output availability deciding unit which decides whether or not to switch off the transmission power from the first base station apparatus, based on a detection result of the hole area from the hole detecting unit.

20. The communication system according to claim 19, wherein
the output availability deciding unit comprises a request receiving unit which receives a request signal which requests the transmission power from the first base station apparatus, from the other base station apparatus; and
the output availability deciding unit resumes the transmission power from the first base station apparatus when the request receiving unit receives the request signal.

21. A method of detecting a hole area to be generated in a cover area of a communication system which comprises a plurality of base station apparatuses and a mobile station apparatus, the method comprising:
measuring each received power from the plurality of base station apparatuses at the mobile station apparatus; and
detecting the hole area which is to be generated when a transmission power from the base station apparatus, which covers a cell in which the mobile station apparatus is positioned, is switched off, based on received power from the other base station apparatus among the plurality of base station apparatuses, other than a base station apparatus which covers the cell in which the mobile station apparatus is positioned.

22. A base station apparatus comprising:
a measurement result receiving unit which receives measurement results of received powers from a plurality of base station apparatuses each measured by a mobile station apparatus, from the mobile station apparatus which is positioned in the cell covered by the base station apparatus; and
a hole detecting unit which, based on a measurement result obtained from the mobile station apparatus by measuring received power from any other base station apparatus measured information except the base station apparatus, detects a hole area which is to be generated when a transmission power from the base station apparatus is switched off.

* * * * *